(12) United States Patent
Hori

(10) Patent No.: US 12,547,697 B2
(45) Date of Patent: Feb. 10, 2026

(54) AUTHENTICATION TARGET APPARATUS AND AUTHENTICATION SYSTEM

(71) Applicant: Canon Kabushiki Kaisha, Tokyo (JP)

(72) Inventor: Kenjiro Hori, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 18/502,210

(22) Filed: Nov. 6, 2023

(65) Prior Publication Data

US 2024/0176862 A1 May 30, 2024

(30) Foreign Application Priority Data

Nov. 29, 2022 (JP) .................................. 2022-190572

(51) Int. Cl.
*G06F 21/44* (2013.01)

(52) U.S. Cl.
CPC .................................. *G06F 21/44* (2013.01)

(58) Field of Classification Search
CPC .......... G06F 21/30; G06F 21/44; G06F 21/70; B41J 27/00; B41K 2202/00; B41K 2202/13
See application file for complete search history.

(56) References Cited

U.S. PATENT DOCUMENTS

| 10,833,877 B2 | 11/2020 | Ittogi et al. |
| 10,965,451 B2 | 3/2021 | Iijima et al. |
| 11,001,069 B2 | 5/2021 | Panshin et al. |
| 11,296,896 B2 | 4/2022 | Iijima et al. |
| 11,777,920 B2 | 10/2023 | Hori |
| 2021/0312021 A1* | 10/2021 | Enomoto .............. H04L 9/3236 |

FOREIGN PATENT DOCUMENTS

| JP | 2005251156 A | 9/2005 |
| JP | 6491743 B2 | 3/2019 |
| JP | 2019186913 A | 10/2019 |
| JP | 2020072348 A | 5/2020 |
| WO | 2018080497 W | 5/2018 |

* cited by examiner

*Primary Examiner* — Boris D Grijalva Lobos
(74) *Attorney, Agent, or Firm* — Venable LLP

(57) ABSTRACT

An authentication target apparatus includes a memory that stores N value pairs each of which includes a preimage value and a verification value used for verification on an intermediate image value derived based on the preimage value. Each verification value is a mapped value that is derived by applying a corresponding preimage value to a function to derive an intermediate image value and then applying the intermediate image value to another function. The apparatus reads the N verification values from the memory, transmits the read N verification values to an authentication system, receives a challenge index from the authentication system, reads a first preimage value corresponding to the challenge index from the memory, derives a first intermediate image value based on the read first preimage value, and transmits the derived first intermediate image value to the authentication system.

20 Claims, 16 Drawing Sheets

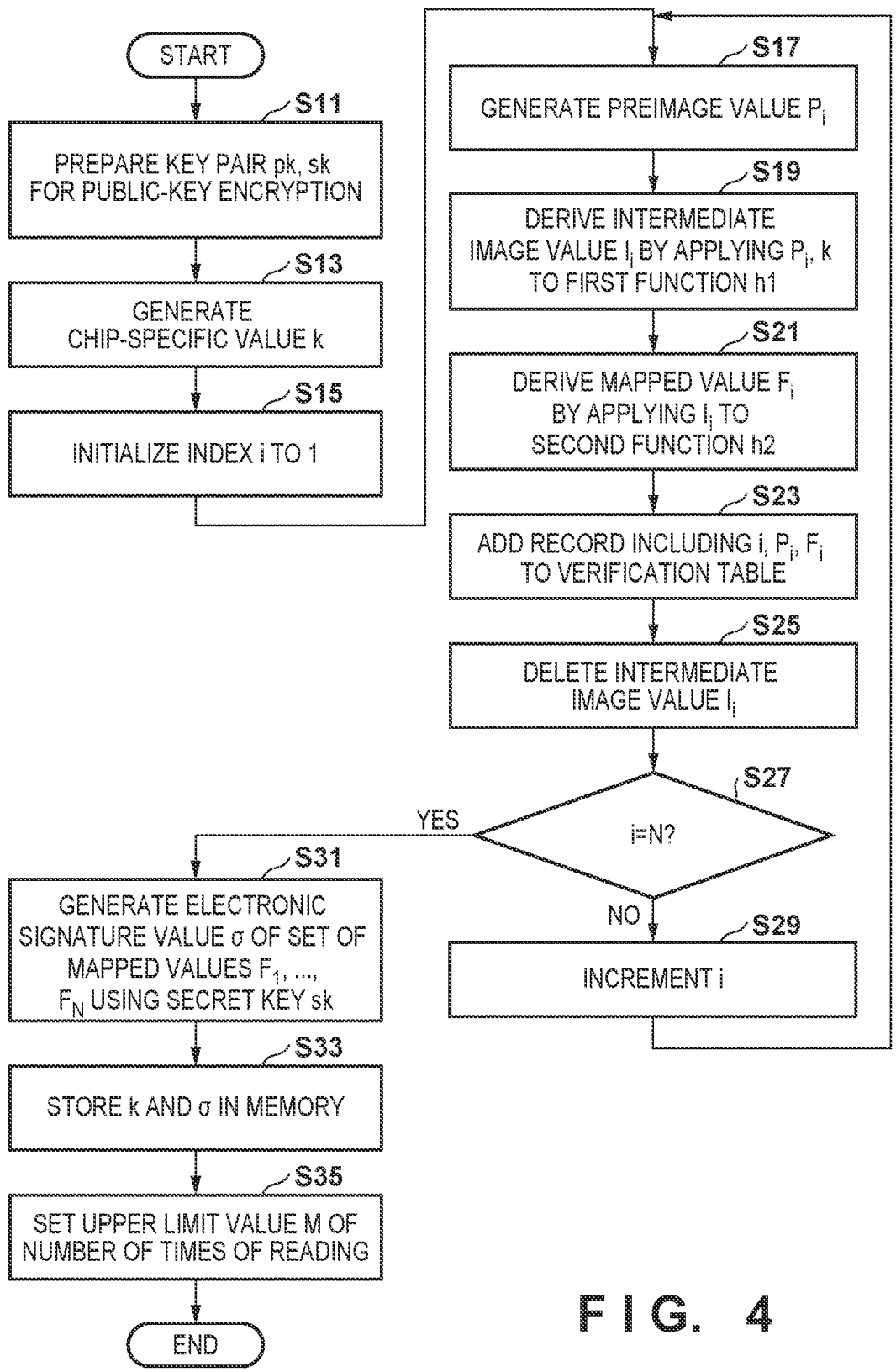
F I G. 4

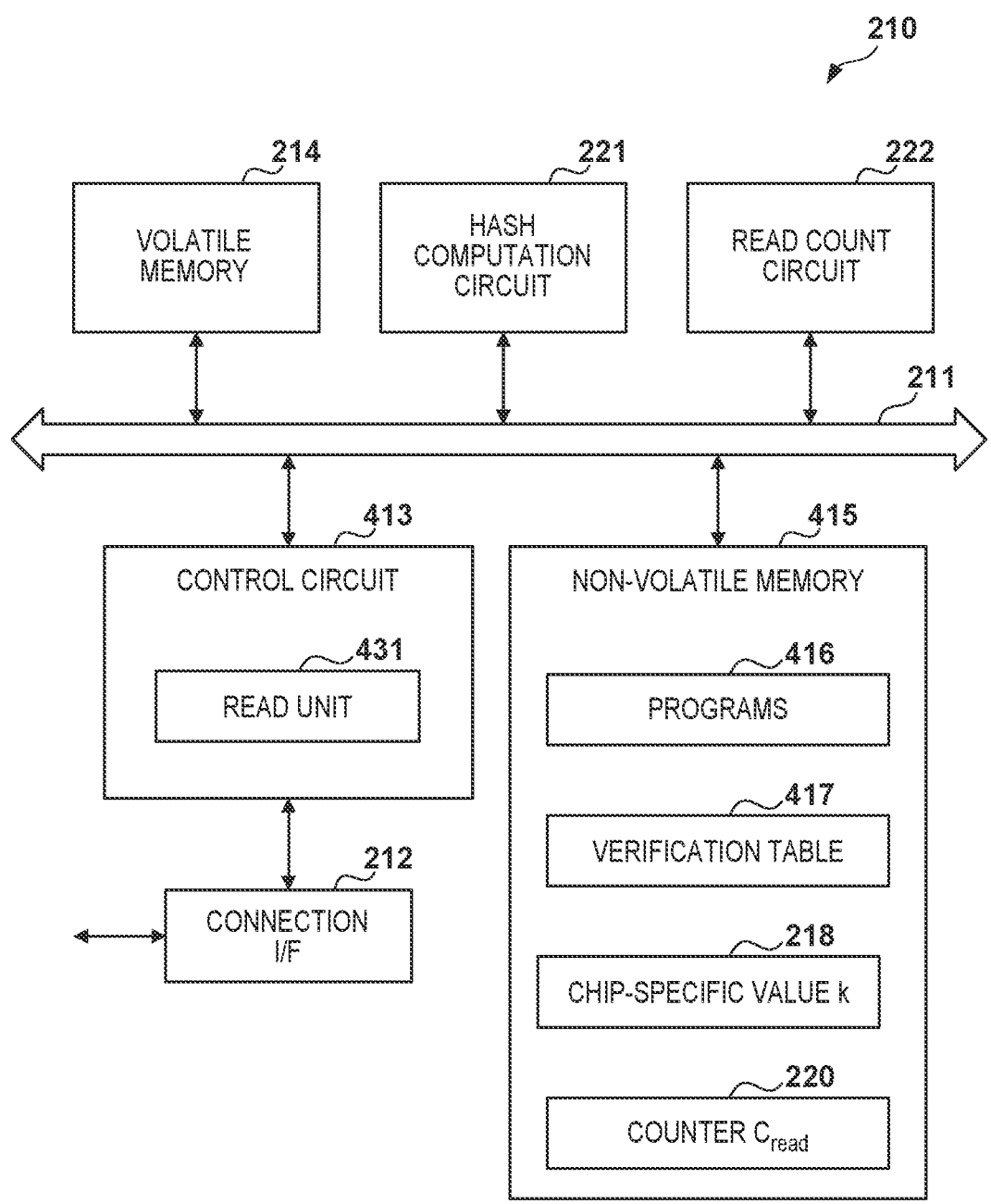
F I G. 10

FIG. 12

| INDEX | PREIMAGE VALUE | SIGNATURE VALUE |
|---|---|---|
| 1 | $P_1$ | $\sigma_1$ |
| 2 | $P_2$ | $\sigma_2$ |
| 3 | $P_3$ | $\sigma_3$ |
| ⋮ | ⋮ | ⋮ |
| N | $P_N$ | $\sigma_N$ |

AUTHENTICATION TARGET APPARATUS AND AUTHENTICATION SYSTEM

BACKGROUND OF THE INVENTION

Field of the Invention

The present disclosure relates to an authentication target apparatus and an authentication system.

Description of the Related Art

Conventionally, many electronic devices have been known that are used in a state where interchangeable components are connected thereto. For example, an image forming apparatus can operate together with a variety of interchangeable components, such as a cartridge containing toner or ink, a process cartridge, a conveyance roller, and a fixing unit. Connection of a non-genuine interchangeable component to an electronic device can cause occurrence of such troubles as a failure or malfunction of the electronic device or a reduction in output quality. For this reason, some of the electronic devices have a mechanism to authenticate whether an interchangeable component connected to the main body is a genuine component.

Japanese Patent No. 6491743 discloses an example of a challenge-response authentication method. According to the authentication method of Japanese Patent No. 6491743, a cartridge that acts as an authentication target apparatus transmits, to a printing apparatus that acts as an authentication host, one of a plurality of authentication values (passwords) that have been stored in an internal memory in advance in response to a request from the printing apparatus, and the printing apparatus performs authentication based on this authentication value. Furthermore, the number of times an authentication value is transmitted from the cartridge to the printing apparatus is restricted to be smaller than a certain maximum number. This restriction prevents all of the authentication values stored in the cartridge from being exposed to the outside, thereby making it possible to suppress the risk of manufacturing of non-genuine components that can fraudulently pass the authentication by way of copying or wiretapping of the read authentication values.

SUMMARY OF THE INVENTION

According to the authentication method of Japanese Patent No. 6491743, provided that the total number of authentication values stored in the cartridge is n and the maximum number of times an authentication value is transmitted to the printing apparatus (i.e., read) is m, n needs to be sufficiently larger than m in order to appropriately reject connection of unauthentic cartridges. In other words, the exposure ratio m/n needs to be sufficiently small. However, the larger the total number n of authentication values is, a memory with a larger capacity is needed in the cartridge. Although reducing the size of each individual authentication value reduces the required amount of the memory, guessing of an authentication value could become easy if the size of authentication values is excessively small.

In view of the above-described issues, the present invention aims to provide a mechanism that can both prevent fraudulence related to authentication on an interchangeable component, and suppress a required amount of a memory.

According to one aspect, there is provided an authentication target apparatus including: a storage unit configured to store in advance N value pairs (N is an integer equal to or larger than two) identified by indices, each value pair including a preimage value, and a verification value used for verification on an intermediate image value derived based on the preimage value; a connection unit that is communicatively connected to an authentication system that authenticates the authentication target apparatus; and a control unit configured to control communication with the authentication system via the connection unit. Each verification value is a mapped value that is derived by applying a corresponding preimage value to a first function to derive an intermediate image value and then applying the intermediate image value to a second function. The control unit is configured to: read the N verification values from the storage unit; transmit the read N verification values to the authentication system; receive a challenge index identifying one out of the N value pairs from the authentication system; read a first preimage value corresponding to the challenge index out of the N preimage values from the storage unit; derive a first intermediate image value by applying the read first preimage value to a third function corresponding to the first function; and transmit the derived first intermediate image value to the authentication system. A corresponding authentication system is also provided.

According to another aspect, there is provided an authentication target apparatus including: a storage unit configured to store in advance N value pairs (N is an integer equal to or larger than two) identified by indices, each value pair including a preimage value, and a verification value used for verification on an intermediate image value derived based on the preimage value; a connection unit that is communicatively connected to an authentication system that authenticates the authentication target apparatus; and a control unit configured to control communication with the authentication system via the connection unit. Each verification value is an electronic signature value used for verification on authenticity of a mapped value that is derived by applying a corresponding preimage value to a first function to derive an intermediate image value and then applying the intermediate image value to a second function, or on authenticity of the intermediate image value, and the control unit is configured to: receive a challenge index identifying one out of the N value pairs from the authentication system; read a first verification value corresponding to the challenge index out of the N verification values from the storage unit; transmit the read first verification value to the authentication system; read a first preimage value corresponding to the challenge index out of the N preimage values from the storage unit; derive a first intermediate image value by applying the read first preimage value to a third function corresponding to the first function; and transmit the derived first intermediate image value to the authentication system. A corresponding authentication system is also provided.

Further features of the present invention will become apparent from the following description of exemplary embodiments (with reference to the attached drawings).

BRIEF DESCRIPTION OF THE DRAWINGS

FIG. 4 is a flowchart showing an example of a flow of data generation processing for generating data to be stored in a memory of the authentication target chip according to the first working example.

FIG. 10 is a block diagram showing an example of a configuration of an authentication target chip according to the second working example.

FIG. 12 is an explanatory diagram for describing a configuration of a verification table according to the second working example.

DESCRIPTION OF THE EMBODIMENTS

Figure 1:
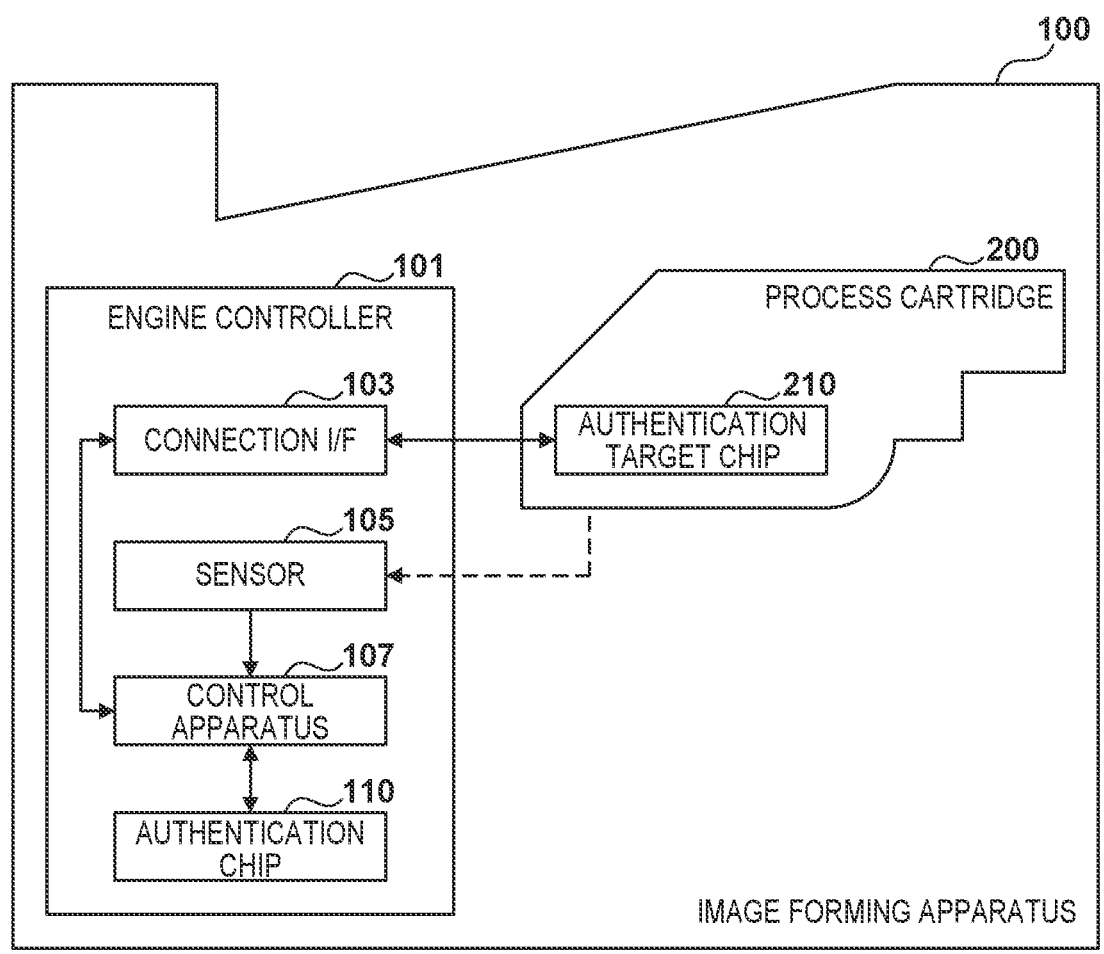
FIG. 1 is a block diagram showing a state where a process cartridge is connected to an image forming apparatus in an embodiment.

The following describes an embodiment in detail with reference to the attached drawings. Note that the following embodiment does not limit the invention according to the claims. Although a plurality of features are described in the embodiment, not all of these plurality of features are indispensable for the invention, and furthermore, the plurality of features may be combined in any manner. Furthermore, regarding the attached drawings, the same or similar constituents are given the same reference numeral, and an overlapping description is omitted.

1. Basic Configuration

In the embodiments described below, it is assumed that an image forming apparatus authenticates a process cartridge connected to the image forming apparatus. Therefore, the image forming apparatus and the process cartridge may be referred to as an authentication system and an authentication target apparatus, respectively. The process cartridge is an example of an interchangeable component for the image forming apparatus. However, the techniques pertaining to the present disclosure are not limited to the combination of the image forming apparatus and the process cartridge, and are applicable to various combinations of an electronic device and an interchangeable component.

FIG. 1 shows a state where a process cartridge 200 is connected to an image forming apparatus 100. The image forming apparatus 100 may be, for example, a printer, a copier, or a multi-functional peripheral, and forms an image on a sheet in accordance with an electrophotographic process. The process cartridge 200 is an interchangeable component involved in the electrophotographic process. For example, a user can open a cover (not shown) mounted on a housing of the image forming apparatus 100 to attach/remove the process cartridge 200 to/from the image forming apparatus 100. The process cartridge 200 includes, for example, a photosensitive member and one or more members for forming a toner image on the surface of the photosensitive member. The image forming apparatus 100 includes an engine controller 101. The engine controller 101 controls an overall image forming operation in the image forming apparatus 100, such as conveyance of a sheet, formation of a toner image by the process cartridge 200, transfer of the toner image to the sheet, and fixing of the toner image on the sheet.

Connection of a non-genuine process cartridge to the image forming apparatus 100 may cause occurrence of such troubles as a failure or malfunction of the apparatus and a reduction in printing quality. In view of this, the image forming apparatus 100 has a mechanism for authenticating whether the process cartridge attached to the apparatus is a genuine product. The functions of the process cartridge 200 attached to the image forming apparatus 100 are enabled only in a case where the authentication has been successful. The engine controller 101 includes a connection interface (I/F) 103, a sensor 105, a control apparatus 107, and an authentication chip 110 as constituent elements related to this authentication mechanism. The process cartridge 200 includes an authentication target chip 210. In the present embodiment, while the authentication target chip 210 is tamper-resistant, the authentication chip 110 may not necessarily be tamper-resistant.

The connection I/F 103 is a connection unit that is communicatively connected to the authentication target chip 210. The connection between the connection I/F 103 and the authentication target chip 210 may be wired connection via an electrical contact point, or may be wireless connection via an antenna. The sensor 105 is an attachment sensor for detecting whether the process cartridge has been attached to the image forming apparatus 100. The control apparatus 107 is a controller that integrally controls the operations of the image forming apparatus 100. The authentication chip 110 is an integrated circuit (IC) chip that has a function of authenticating whether the process cartridge 200 is a genuine product based on authentication data received from the authentication target chip 210 via the connection I/F 103. The authentication target chip 210 is an IC chip including a built-in memory that has stored authentication data for the process cartridge 200 in advance.

In the present embodiment, the authentication target chip 210 includes a verification table that stores N value pairs identified by indices. Each value pair includes a preimage value and a verification value used for verification on an intermediate image value derived based on the preimage value. Here, a preimage value denotes a value before conversion based on a below-described function (also called a map). An intermediate image value denotes a value which follows conversion of a preimage value based on a certain function, and which precedes conversion based on another function. An intermediate image value need not be stored permanently in the memory, and can be deleted after being temporarily generated during the authentication; from this viewpoint, the intermediate image value may be referred to as a temporary mapped value. An intermediate image value can be verified using a mapped value after conversion of the intermediate image value based on another function, and a verification value. N, which indicates the number of value pairs in the verification table, may be an integer equal to or larger than two, and is preferably a reasonably large value, such as 256 or 384.

When the sensor 105 has detected that the process cartridge has been attached to the image forming apparatus 100, the control apparatus 107 starts authentication processing. In this authentication processing, the authentication chip 110 generates a random numerical value within the range of the indices (e.g., 1 to N) in the verification table of the authentication target chip 210. In the following description, this random numerical value will be referred to as a challenge index. The authentication chip 110 transmits a challenge indicating the generated challenge index to the authentication target chip 210 via the connection I/F 103. In response to the challenge, the authentication target chip 210 reads a preimage value corresponding to the challenge index from the memory, and returns a response indicating an intermediate image value derived based on the read preimage value to the authentication chip 110. Furthermore, the authentication target chip 210 transmits a verification value used for verification on the intermediate image value to the authentication chip 110. The authentication chip 110 authenticates whether the attached process cartridge 200 is a genuine product based on these intermediate image value and verification value received from the authentication target chip 210, and outputs the result of the authentication to the control apparatus 107.

Regarding what kind of verification value is used for verification on an intermediate image value in the foregoing authentication processing, several working examples are possible. In the next section onward, these working examples will be described in order.

2. First Working Example

2-1. Exemplary Configuration of Authentication Chip

Figure 2:
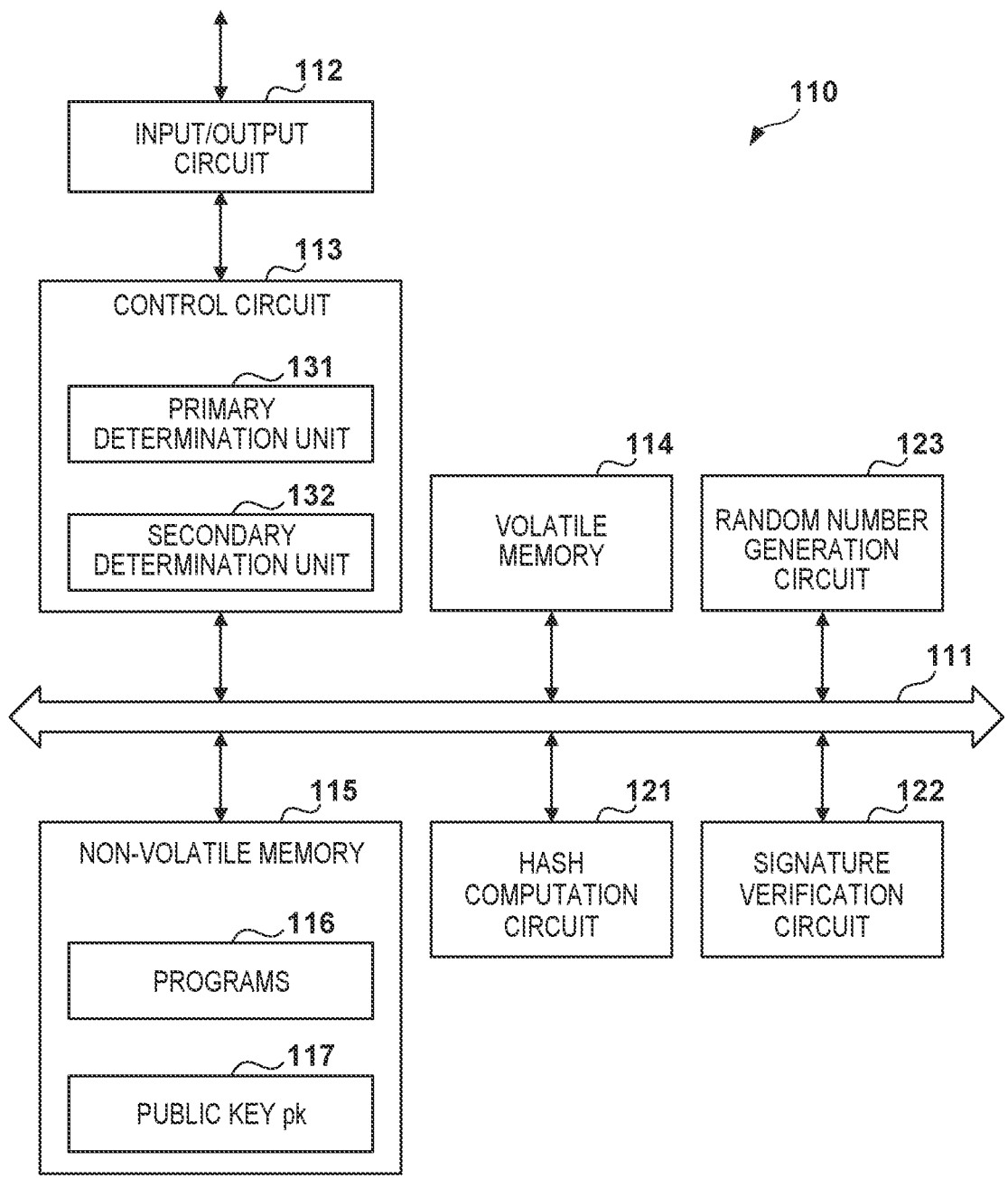
FIG. 2 is a block diagram showing an example of a configuration of an authentication chip according to a first working example.

FIG. 2 is a block diagram showing an example of a configuration of the authentication chip 110 according to the first working example. Referring to FIG. 2, the authentication chip 110 includes an internal bus 111, an input/output circuit 112, a control circuit 113, a volatile memory 114, a non-volatile memory 115, a hash computation circuit 121, a signature verification circuit 122, and a random number generation circuit 123.

The internal bus 111 is a signal line by which the control circuit 113, volatile memory 114, non-volatile memory 115, hash computation circuit 121, signature verification circuit 122, and random number generation circuit 123 are mutually connected. The input/output circuit 112 relays data between the control apparatus 107 and the control circuit 113 of the authentication chip 110. The control circuit 113 is a control unit that controls communication with the authentication target apparatus. The control circuit 113 may be, for example, a central processing unit (CPU), a microcontroller, or a microprocessor, and executes various types of processing in accordance with commands input from the control apparatus 107. The volatile memory 114 may be, for example, a random access memory (RAM), and provides a temporary storage area for computation to the control circuit 113. The non-volatile memory 115 may include, for example, a semiconductor memory or a hard disk, and is a storage unit that stores one or more computer programs 116 executed by the control circuit 113, control parameters (not shown), and a public key (pk) 117. The hash computation circuit 121 is a computation unit that executes computation of a hash function. Examples of the hash function that can be used in the present working example will be described below. The signature verification circuit 122 is a verification unit that executes signature verification using an electronic signature for verification on authenticity of data (or an apparatus that acts as a transmission source of the data). In the present working example, a digital signature based on a public-key encryption method can be used as the electronic signature. The random number generation circuit 123 is a generation unit that generates a random numerical value in accordance with a command input from the control circuit 113. In the present working example, the random number generation circuit 123 is used to generate the above-described challenge index.

In the present working example, the control circuit 113 functions as a primary determination unit 131 and a secondary determination unit 132. That is to say, the authentication processing executed by the image forming apparatus 100 is divided into two stages: primary determination and secondary determination. The primary determination unit 131 verifies authenticity with respect to a verification value received from the authentication target chip 210. Using the verification value that has been determined to be authentic by the primary determination unit 131, the secondary determination unit 132 performs authentication based on a response that is returned from the authentication target chip 210 responsively to the challenge. A flow of processing including these primary determination and secondary determination will be described below in detail.

2-2. Exemplary Configuration of Authentication Target Chip

Figure 3:
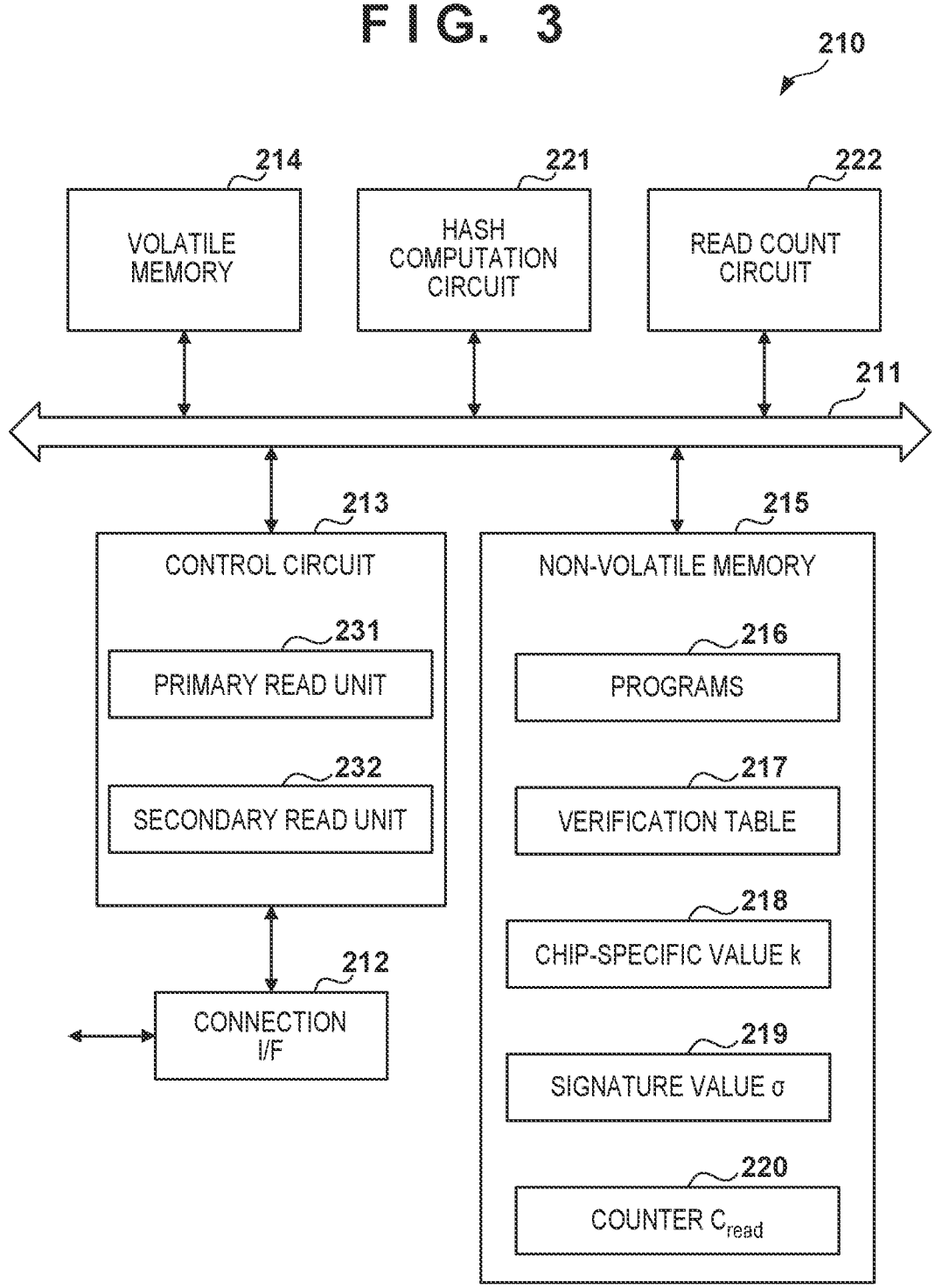
FIG. 3 is a block diagram showing an example of a configuration of an authentication target chip according to the first working example.

FIG. 3 is a block diagram showing an example of a configuration of the authentication target chip 210 according to the first working example. Referring to FIG. 3, the authentication target chip 210 includes an internal bus 211, a connection I/F 212, a control circuit 213, a volatile memory 214, a non-volatile memory 215, a hash computation circuit 221, and a read count circuit 222.

The internal bus 211 is a signal line by which the control circuit 213, volatile memory 214, non-volatile memory 215, hash computation circuit 221, and read count circuit 222 are mutually connected. The connection I/F 212 is a connection unit that is communicatively connected to the authentication system. The control circuit 213 is a control unit that controls communication with the authentication system via the connection I/F 212. The control circuit 213 may be, for example, a CPU, a microcontroller, or a microprocessor. The volatile memory 214 may be, for example, a RAM, and provides a temporary storage area for computation to the control circuit 213. The non-volatile memory 215 is a storage unit that stores one or more computer programs 216 executed by the control circuit 213, control parameters (not shown), and various types of data required for authentication on the process cartridge 200. For example, in the present working example, the non-volatile memory 215 stores in advance a verification table 217, a chip-specific value (k) 218, and a signature value ($\sigma$) 219 as authentication data. Furthermore, the non-volatile memory 215 stores a counter ($C_{read}$) 220. The hash computation circuit 221 is a computation unit that executes computation of a hash function. The read count circuit 222 is a count unit that counts the number of times a preimage value has been read from the verification table 217 in response to reception of a challenge index from the authentication system to which the process cartridge 200 has been attached, and updates the value $C_{read}$ of the counter 220.

In the present working example, the control circuit 213 functions as a primary read unit 231 and a secondary read unit 232. That is to say, reading of data from the non-volatile memory 215 in the authentication processing is divided into two stages: primary reading and secondary reading. The primary read unit 231 reads at least one verification value used for verification on an intermediate image value from the verification table 217, and transmits at least one verification value that has been read to the authentication system. The secondary read unit 232 reads a preimage value corresponding to the challenge index from the verification table 217, derives an intermediate image value based on the read preimage value, and transmits the derived intermediate image value to the authentication system. A flow of processing including these primary reading and secondary reading will be described below in detail.

Note that each of the circuits that are illustrated separately from the control circuit in FIG. 2 and FIG. 3 (e.g., the hash computation circuit, the signature verification circuit, and the read count circuit) may alternatively be implemented as a software module executed by the control circuit, rather than being implemented as an independent circuit. Furthermore, each of the modules that have been described as functions of the control circuit (e.g., the primary/secondary read units, and the primary/secondary determination units) may alternatively be implemented as an independent circuit separate from the control circuit.

2-3. Generation of Authentication Data and Storing of the Same into Memory

In a cartridge manufacturing phase, a manufacturer of the process cartridge 200 generates a secret value k that is specific to the cartridge (hereinafter referred to as a chip-specific value) and N pairs of a preimage value and a verification value to be included in the above-described verification table. In the present working example, each of the N verification values is a mapped value derived by deriving an intermediate image value through application of a corresponding preimage value to a first function, and further by applying the derived intermediate image value to a second function. The manufacturer further generates an electronic signature value σ used for verification on authenticity of the set of N verification values (that is to say, N mapped values). Then, the authentication target chip 210 including the non-volatile memory 215 that have stored these pieces of data is embedded in the process cartridge 200. In the present section, processing of the above-described cartridge manufacturing phase will be described.

FIG. 4 is a flowchart showing an example of a flow of data generation processing for generating data to be stored in the non-volatile memory 215. The data generation processing of FIG. 4 may be executed on an apparatus different from the image forming apparatus 100 and the process cartridge 200 (e.g., a general-purpose computer). Note that processing steps will be abbreviated as "S" in the following description.

Referring to FIG. 4, in step S11, a pair of a public key pk and a secret key sk for public-key encryption is first prepared prior to generation of data. Here, the prepared key pair may vary with, for example, each individual image forming apparatus, or may be shared among a plurality of image forming apparatuses manufactured by a genuine manufacturer.

Next, in step S13, a random numerical value of a predetermined length is generated as a chip-specific value k. The length $L_K$ of the chip-specific value k may be, for example, $L_K$=16 [byte]. The chip-specific value k is a value that varies with each authentication target apparatus.

Next, in step S15, a variable i indicating an index (ID) is initialized to 1. Next, in step S17, a random numerical value of a predetermined length is generated as the $i^{th}$ preimage value $P_i$. The length $L_P$ of the preimage value $P_i$ may be, for example, $L_P$=4 [byte].

Next, in step S19, an intermediate image value $I_i$ is derived by applying the preimage value $P_i$ and the chip-specific value k to the first function h1 in accordance with, for example, the following expression (1).

$$I_i = h1(k \| P_i) \quad (1)$$

Here, the operator ∥ denotes computation for concatenating the values before and after this operator. As indicated by expression (1), the first function h1 accepts the preimage value $P_i$, together with the chip-specific value k, as inputs, and outputs the corresponding intermediate image value $I_i$. The first function h1 is typically a cryptographic hash function. SHA-512, which is defined by the National Institute of Standards and Technology (NIST) as FIPS PUB 180-2, can be used as an example of the cryptographic hash function. In this case, the length $L_I$ of the intermediate image value $I_i$ is $L_I$=64 [byte]. Note that SHA-512 is merely an example of the cryptographic hash function that can be used as the first function h1. Any cryptographic hash function may be used as the first function h1 as long as it poses difficulty in preimage calculation, which makes it difficult to estimate the preimage value from the intermediate image value. The fact that the length $L_I$ of the intermediate image value $I_i$ output from the first function h1 is longer than the length $L_P$ of the preimage value $P_i$, contributes to achievement of both robustness of authentication and suppression of a required memory size. In this regard, a discussion will be provided below by making a comparison with a comparative example.

Next, in step S21, a mapped value $F_i$ is derived by applying the intermediate image value $I_i$ to the second function h2 in accordance with, for example, the following expression (2).

$$F_i = h2(I_i) \quad (2)$$

As indicated by expression (2), the second function h2 accepts the intermediate image value $I_i$ as an input, and outputs the corresponding mapped value $F_i$. The second function h2 may be the same as the first function h1, or may be different from the first function h1. The second function h2, too, may be a cryptographic hash function, for example. It is assumed here that, as an example, the second function h2 is a function that converts an input value using SHA-512, cuts off 48 low-order bytes of the post-conversion value, and uses 16 high-order bytes as an output value. Therefore, the length $L_F$ of the mapped value $F_i$ is $L_F$=16 [byte]. The fact that the length $L_F$ of the mapped value $F_i$ output from the second function h2 is shorter than the length $L_I$ of the intermediate image value $I_i$, contributes to achievement of both robustness of authentication and suppression of a required memory size. In this regard, too, a discussion will be provided below by making a comparison with a comparative example.

Next, in step S23, one record including the index i, the preimage value $P_i$, and the mapped value $F_i$ is added to the verification table 217. Next, in step S25, the intermediate image value $I_i$ used for derivation of the mapped value $F_i$ is deleted.

Next, in step S27, whether the variable i has reached the number N of value pairs to be generated is determined. In a case where the variable i has not reached N, the variable i is incremented (i←i+1) in step S29, and the above-described steps S17 to S25 are repeated with respect to the value of the next index. In a case where the variable i has reached N, processing proceeds to step S31.

In step S31, an electronic signature value σ of the set of N mapped values $F_1, \ldots, F_N$ is generated using the secret key sk in accordance with the following expression (3).

$$\sigma = \text{Sign}(sk, F_1 \| F_2 \| \ldots \| F_N) \quad (3)$$

The function Sign in expression (3) denotes a digital signature algorithm. The digital signature algorithm used here may be, for example, an algorithm that has been defined by the NIST as FIPS PUB 186-4. The first argument of the function Sign is the secret key sk, and the second argument thereof is the concatenation of N mapped values $F_1, \ldots, F_N$. The length $L_{SIG}$ of the signature value σ output from the function Sign is $L_{SIG}=64$ [byte].

Next, in step S33, the chip-specific value k and the electronic signature value σ are stored to the non-volatile memory 215. Although not shown in FIG. 4, the public key pk, which is paired with the secret key sk used in generation of the electronic signature value σ, is stored to the non-volatile memory 115 in the manufacturing phase of the authentication chip 110.

Next, in step S35, a parameter M indicating an upper limit of the number of times a preimage value is read from the verification table 217 is set at a predetermined value. Here, the predetermined value is an integer that is equal to or larger than one, and is smaller than N. For example, M may be eight. In this case, each authentication system is allowed to receive a response to a challenge from the authentication target chip 210 up to eight times. Then, the data generation processing of FIG. 4 is ended.

In the above-described example, the length $L_K$ of the chip-specific value is 16 bytes (=128 bits), meaning that the number of attempts required to estimate the chip-specific value k through a brute-force search is $2^{128}$. Making a large number of attempts in this way is realistically difficult to achieve; this computational security ensures secrecy of the chip-specific value k. Note that the length of 16 bytes is merely an example, and another length may be selected. Similarly, the preimage length $L_P$ of 4 bytes is also merely an example, and another length may be selected.

Figure 5:
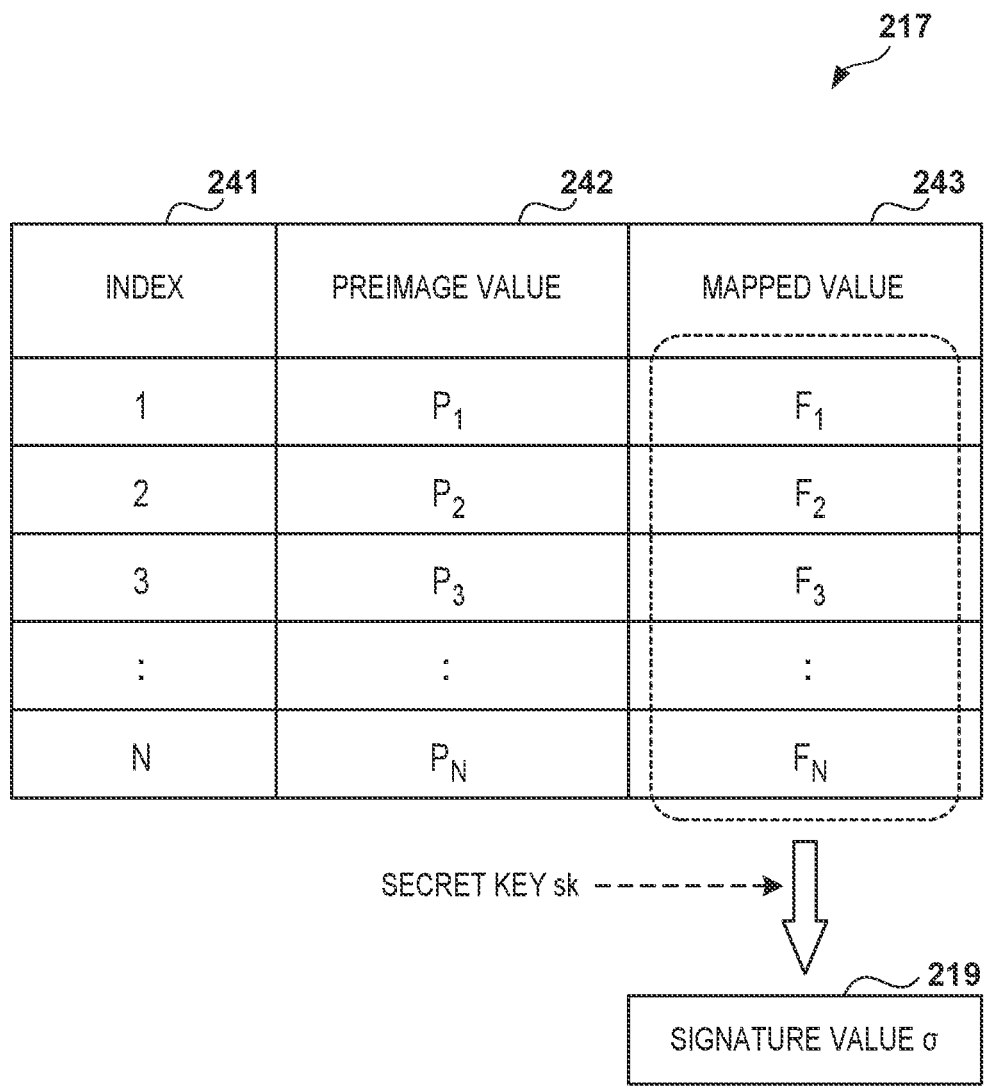
FIG. 5 is an explanatory diagram for describing a configuration of a verification table according to the first working example.

FIG. 5 is an explanatory diagram for describing a configuration of the verification table 217 according to the present working example. Referring to FIG. 5, the verification table 217 includes three data items: Index 241, Preimage Value 242, and Mapped Value 243. Index 241 is a numerical value for uniquely identifying each of the N value pairs stored in the verification table 217. Preimage Value 242 is a random numerical value that is determined in advance, and is used for derivation of an intermediate image value. Values under Preimage Value 242 are not exposed to another apparatus. Mapped Value 243 is a numerical value that is used as a verification value in the present working example, and is used for verification on an intermediate image value derived based on a corresponding value under Preimage Value 242. The non-volatile memory 215 in the authentication target apparatus stores in advance N records in such a verification table 217 generated by repeating step S23 of the data generation processing shown in FIG. 4 N times. Furthermore, in the present working example, the non-volatile memory 215 stores the electronic signature value σ, which is generated using the secret key sk in step S31 of the data generation processing shown in FIG. 4, and which is for verifying authenticity of N values from Mapped Value 243 in the verification table 217.

2-4. Authentication on Cartridge

Figure 6:
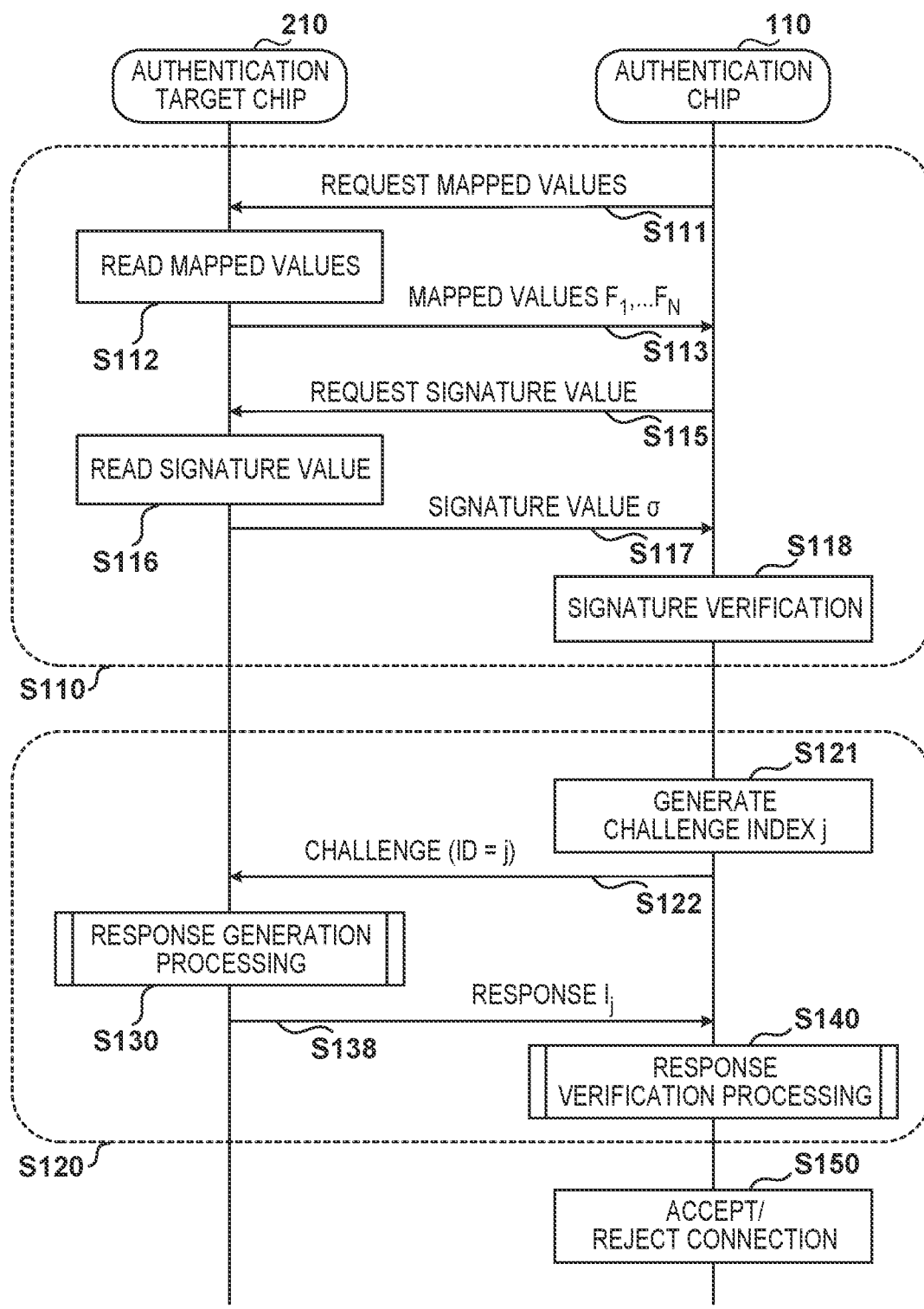
FIG. 6 is a sequence diagram showing an example of an overall flow of authentication processing according to the first working example.

FIG. 6 is a sequence diagram showing an example of an overall flow of the authentication processing according to the present working example. The authentication processing shown in FIG. 6 is started on the occurrence of a trigger, which is the sensor 105's detection of attachment of the process cartridge 200 to the image forming apparatus 100. The authentication chip 110 of the image forming apparatus 100 and the authentication target chip 210 of the process cartridge 200 are mainly involved in the authentication processing.

In the example of FIG. 6, the authentication processing is made up of a primary determination stage S110 and a secondary determination stage S120. In the primary determination stage S110, first, the primary determination unit 131 of the authentication chip 110 transmits a request that demands reading of mapped values (a mapped value request) to the authentication target chip 210 in step S111. In response to reception of the mapped value request, the primary read unit 231 of the authentication target chip 210 reads N mapped values $F_1, \ldots, F_N$ from the verification table 217 in step S112. Then, in step S113, the primary read unit 231 transmits the read N mapped values $F_1, \ldots, F_N$ to the authentication chip 110. The primary determination unit 131 of the authentication chip 110 receives the N mapped values $F_1, \ldots, F_N$ from the authentication target chip 210.

Next, in step S115, the primary determination unit 131 transmits a request that demands reading of a signature value (a signature value request) to the authentication target chip 210. In response to reception of the signature value request, the primary read unit 231 of the authentication target chip 210 reads the signature value σ from the non-volatile memory 215 in step S116. Then, in step S117, the primary read unit 231 transmits the read signature value σ to the authentication chip 110. Upon receiving the signature value σ from the authentication target chip 210, the primary determination unit 131 of the authentication chip 110 causes the signature verification circuit 122 to verify authenticity of the N mapped values $F_1, \ldots, F_N$ using the signature value σ in step S118. Here, the signature verification can be denoted by the following expression (4).

$$\text{res} = \text{Verify}(pk, F_1 \| F_2 \| \ldots \| F_N, \sigma) \quad (4)$$

The function Verify of expression (4) represents a digital signature verification algorithm corresponding to the digital signature algorithm used in expression (3). The first argument of the function Verify is the public key pk stored in the non-volatile memory 115, the second argument thereof is the concatenation of N mapped values $F_1, \ldots, F_N$, and the third argument thereof is the signature value σ. The output res of the function Verify indicates the signature verification result, that is to say, whether the verification has been successful or failed, using a logical value ("true" or "false"). If the N mapped values $F_1, \ldots, F_N$ received in step S113 are authentic, the signature verification result res indicates "true" based on the mechanism of public-key encryption. If at least one of the N mapped values $F_1, \ldots, F_N$ received in step S113 is unauthentic, or the signature value σ is unauthentic, the signature verification result res indicates "false".

In a case where the signature verification result res indicates "false", the primary determination unit 131 notifies the control apparatus 107 of the failure in the signature verification. In this case, the secondary determination stage S120 is omitted. Then, in step S150, the control apparatus 107 rejects (or suspends) connection of the process cartridge 200, and warns a user that the process cartridge 200 is not a genuine product. Here, the warning may be provided using any technique, for example, by displaying a warning message on a display of the image forming apparatus 100, lighting a warning lamp, outputting a warning sound, or the like. In a case where the signature verification result res indicates "true", the authentication processing proceeds to the secondary determination stage S120. At this time, the N mapped values $F_1, \ldots, F_N$ received in step S113 are held in the volatile memory 114.

In the secondary determination stage S120, first, the secondary determination unit 132 of the authentication chip 110 causes the random number generation circuit 123 to generate a challenge index j in step S121. The challenge index j is an integer value that is randomly determined within the range of the indices [1, N] in the verification table 217 of the authentication target chip 210. Next, in step S122, the secondary determination unit 132 transmits a challenge indicating the value of the challenge index j to the authentication target chip 210. In response to reception of the challenge, the secondary read unit 232 of the authentication target chip 210 executes response generation processing in step S130.

Figure 7:
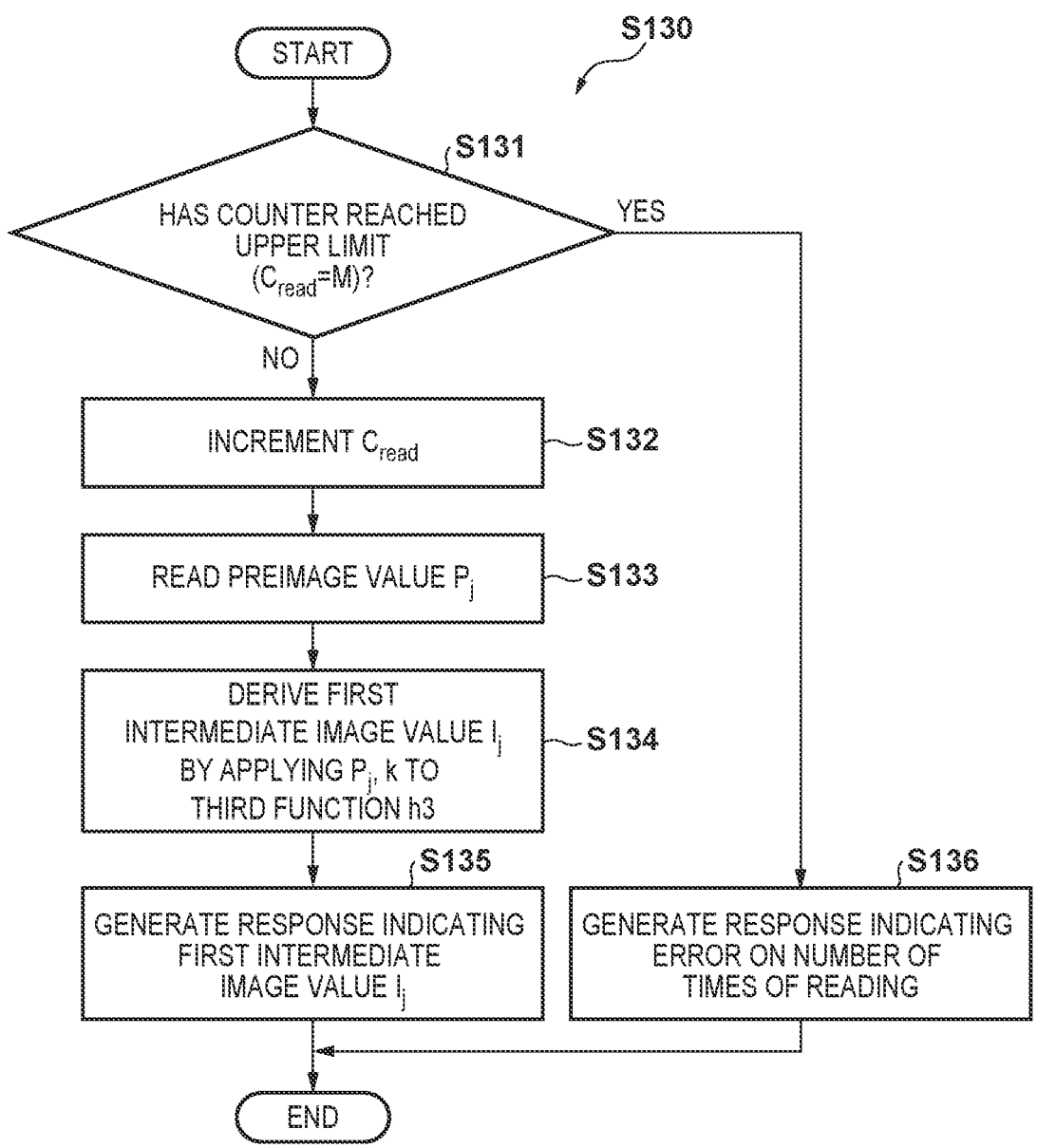
FIG. 7 is a flowchart showing an example of a detailed flow of response generation processing shown in FIG. 6.

FIG. 7 is a flowchart showing an example of a detailed flow of the response generation processing that is executed by the secondary read unit 232 of the authentication target chip 210 in step S130 of FIG. 6.

Referring to FIG. 7, first, the secondary read unit 232 determines whether the counter $C_{read}$, which indicates the number of times a preimage value has been read from the verification table 217 in response to a challenge from the authentication chip 110, has already reached the upper limit value M in step S131. In a case where the counter $C_{read}$ has not reached the upper limit value M yet ($C_{read}$<M), processing proceeds to step S132. On the other hand, in a case where the counter $C_{read}$ has already reached the upper limit value M ($C_{read}$=M), processing proceeds to step S136.

In step S132, the read count circuit 222 increments the counter $C_{read}$. Next, in step S133, the secondary read unit 232 reads, from the verification table 217, a first preimage value $P_j$ identified by the challenge index j received from the authentication chip 110. Next, in step S134, the secondary read unit 232 causes the hash computation circuit 221 to derive a first intermediate image value $I_j$ by applying the read first preimage value $P_j$ and the chip-specific value k to a third function h3 as indicated by, for example, the following expression (5).

$$I_j = h3(k\|P_j) \qquad (5)$$

Here, the third function h3 is a function that is the same as the first function h1. That is to say, the third function h3 may be a cryptographic hash function that accepts the first preimage value $P_j$, together with the chip-specific value k, as inputs and outputs the corresponding first intermediate image value $I_j$. Then, in step S135, the secondary read unit 232 generates a response indicating the derived first intermediate image value $I_j$.

On the other hand, in step S136, the secondary read unit 232 rejects reading of a preimage value from the verification table 217, and generates a response indicating an error on the number of times of reading.

Returning to FIG. 6, in step S138, the secondary read unit 232 returns the response that has been generated through the above-described response generation processing to the authentication chip 110. In a case where the counter $C_{read}$ has not reached the upper limit value M yet, this response indicates the value of the first intermediate image value $I_j$ corresponding to the challenge index j. Upon receiving the response from the authentication target chip 210, the secondary determination unit 132 of the authentication chip 110 executes response verification processing in step S140.

Figure 8:
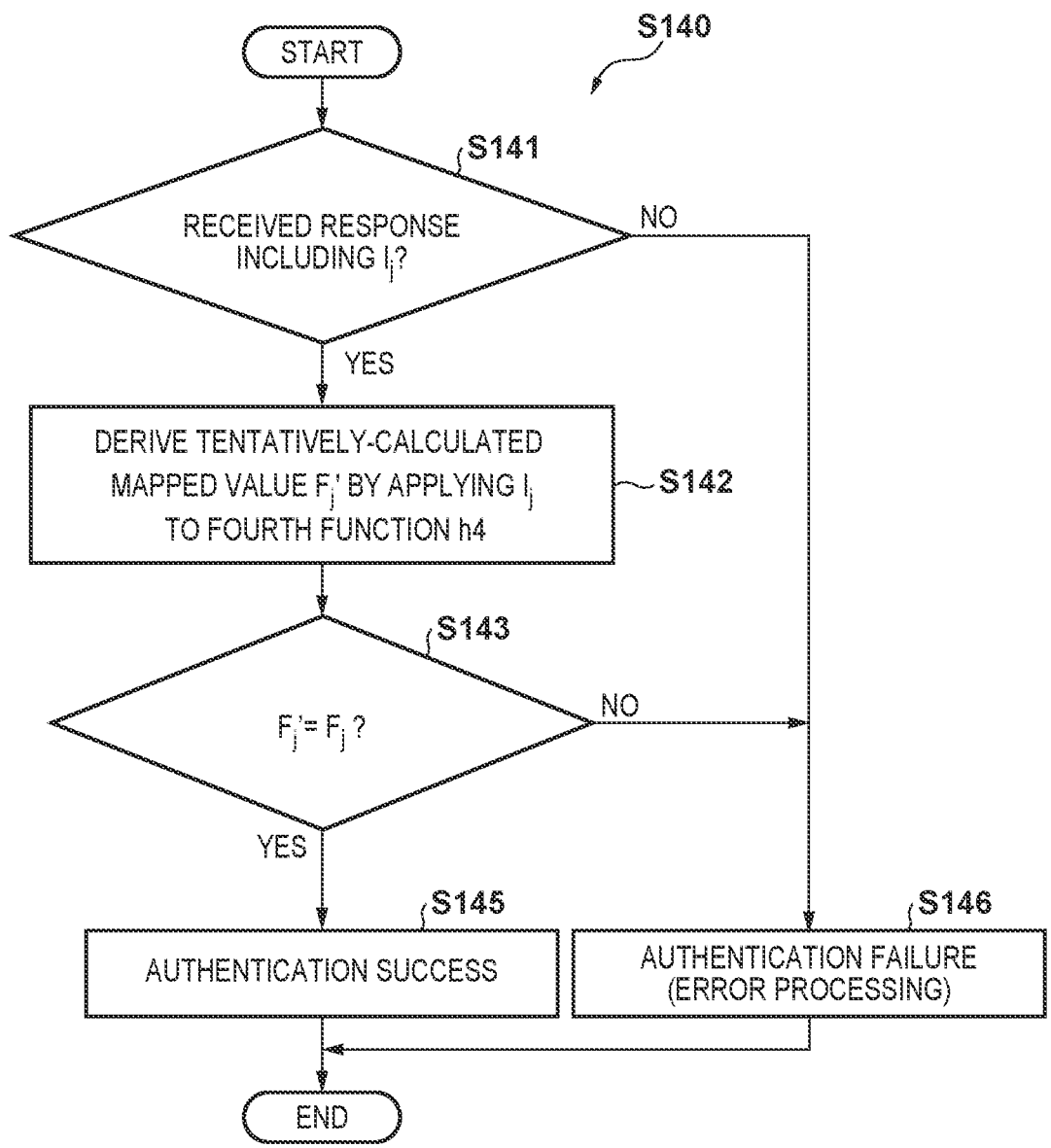
FIG. 8 is a flowchart showing an example of a detailed flow of response verification processing shown in FIG. 6.

FIG. 8 is a flowchart showing an example of a detailed flow of the response verification processing that is executed by the secondary determination unit 132 of the authentication chip 110 in step S140 of FIG. 6.

Referring to FIG. 8, first, the secondary determination unit 132 determines whether the received response indicates a value of the first intermediate image value $I_j$ corresponding to the challenge index j in step S141. In a case where the response indicates the value of the first intermediate image value $I_j$, processing proceeds to step S142. On the other hand, in a case where the response indicates some sort of error (e.g., the error on the number of times of reading), processing proceeds to step S146.

In step S142, the secondary determination unit 132 causes the hash computation circuit 121 to derive a first tentatively-calculated mapped value $F_j'$ by applying the first intermediate image value $I_j$ to a fourth function h4 as indicated by, for example, the following expression (6).

$$F_j' = h4(I_j) \qquad (6)$$

Here, the fourth function h4 is a function that is the same as the second function h2. That is to say, the fourth function h4 may be a cryptographic hash function that accepts the first intermediate image value $I_j$ as an input and outputs the corresponding first tentatively-calculated mapped value $F_j'$; note that several low-order bytes (e.g., 48 bytes) of the value after the hash conversion may be cut off.

Next, in step S143, the secondary determination unit 132 compares the first tentatively-calculated mapped value $F_j'$ derived in step S142 with the corresponding mapped value $F_j$ that is identified by the index j out of the N mapped values received from the authentication target chip 210 in step S113. Here, in a case where the first tentatively-calculated mapped value $F_j'$ matches the corresponding mapped value $F_j$, processing proceeds to step S145. On the other hand, in a case where the first tentatively-calculated mapped value $F_j'$ does not match the corresponding mapped value $F_j$, processing proceeds to step S146.

In step S145, as the first tentatively-calculated mapped value $F_j'$ matches the corresponding mapped value $F_j$, the secondary determination unit 132 determines that the authentication on the authentication target chip 210 is successful. On the other hand, in step S146, the secondary determination unit 132 determines that the authentication on the authentication target chip 210 has failed because of the error on the number of times of reading, or mismatch between the mapped values.

Returning to FIG. 6, in step S150, the secondary determination unit 132 notifies the control apparatus 107 of the engine controller 101 of the result of the above-described response verification processing. In a case where the authentication has been successful, the control apparatus 107 accepts connection of the process cartridge 200, and enables image formation using the process cartridge 200. For example, the control apparatus 107 may read other control parameters that can be held in the memory of the process cartridge 200 (e.g., parameters related to image forming conditions), and use the same for later image forming operations.

On the other hand, in a case where the authentication has failed, the control apparatus 107 rejects (or suspends) connection of the process cartridge 200, and warns the user that the process cartridge 200 is not a genuine product. As stated earlier, the warning may be provided using any technique, for example, by displaying a warning message on a display of the image forming apparatus 100, lighting a warning lamp, outputting a warning sound, or the like.

Note that the above-described authentication processing may typically be executed upon detecting that a new cartridge has been attached to the image forming apparatus 100, and not be executed in a case where a cartridge that has been removed once has been attached to the same image forming apparatus 100 again. The engine controller 101 may store identification information or a signature value of a cartridge for which authentication has been successful in an internal memory, and accept connection of the authenticated cartridge without executing the authentication processing again in a case where the authenticated cartridge has been attached.

While FIG. 6 shows an example in which challenge-response verification is performed after the signature verification in the authentication processing, the signature verification may be performed after challenge-response verification. In this case, the signature verification may be performed only in a case where the verification using the first tentatively-calculated mapped value F derived based on the first intermediate image value has been successful in step S140.

2-5. Summary of First Working Example

In the above-described first working example, although N mapped values including a first mapped value, which are used as verification values, are exposed from the authentication target apparatus to the outside, as these mapped values are values after applying hash conversion to corresponding intermediate image values, it is practically impossible to guess the respective intermediate image values from the N mapped values. Even if a third party attempts to manufacture authentication target apparatuses by fabricating an intermediate image value, they cannot generate an authentic electronic signature value for mapped values based on the fabricated intermediate image value because the secret key sk is unknown, and authentication does not succeed.

Furthermore, the number of times the authentication target apparatus reads a preimage value from a memory in response to a challenge from the same authentication system is suppressed so as not to exceed the upper limit value M. In addition, at most M intermediate image values that are derived based on corresponding preimage values are exposed to the outside by way of responses to challenges, instead of preimage values per se. This upper limit value M is set in such a manner that it is sufficiently small compared to the total number N of preimage values. If N=256 and M=8, then the exposure ratio M/N=1/32; this, however, is a mere example. Therefore, even if a fraudulent third party attempts to copy and reuse M pairs of a challenge index and an intermediate image value, the probability of the next challenge index being included in the exposed M indices is low; thus, it is difficult to pass the authentication. Also, as intermediate image values are values after applying hash conversion to corresponding preimage values (using a cryptographic hash function), it is also practically impossible to guess the preimage values stored in the authentication target apparatus from the exposed intermediate image values. Moreover, the intermediate image length is set to be significantly large, such as 64 bytes, compared to the preimage length and the chip-specific value length; therefore, copying of intermediate image values will also require a large amount of memory.

Furthermore, the length of input data for the first function and the third function, which are used for derivation of an intermediate image value, is 20 bytes (=160 bits) equivalent to the concatenation of a 4-byte preimage value and a 16-byte chip-specific value. Therefore, when a third party attempts to detect input data that conforms with an exposed intermediate image value through an exhaustive search, as many as $2^{160}$ attempts are needed, which means that the exhaustive search is realistically difficult. Meanwhile, in the above-described first working example, as the length $L_P$ of each preimage value is small, such as 4 bytes, the number N of preimage values that can be stored using the same amount of memory resource can be increased; this effectively contributes to suppression of the exposure ratio M/N.

The following Table 1 and Table 2 show an example of comparison between a first comparative example and the first working example in terms of a required memory size and a communication amount; the first comparative example uses a preimage value to respond to a challenge without using an intermediate image value, whereas the first working example uses an intermediate image value generated based on a preimage value to respond to a challenge. In both of the first comparative example and the first working example, the number N of indices=256, the mapping length $L_F$=16 [byte], and the signature length $L_{SIG}$=64 [byte].

In the first comparative example, the preimage length $L_P$ is set at 16 bytes, which is equal to the mapping length $L_F$, to make the exhaustive search difficult. In the first comparative example, a chip-specific value k is not used. In this case, as shown in Table 1, the required memory size of the authentication target apparatus is $(L_P+L_F) \times N+L_{SIG}$=8256 [byte]. The communication amount of authentication data transmitted from the authentication target apparatus to the authentication system is $L_F \times N+L_{SIG}+L_P$=4176 [byte].

On the other hand, in the first working example, the preimage length $L_P$ is set at 4 bytes. In addition, a chip-specific value k of the length $L_K$=16 bytes is used. Note that the same chip-specific value k is used for N preimage values. The intermediate image length $L_I$ is set at 64 bytes. In this case, as shown in Table 2, the required memory size of the authentication target apparatus is $(L_P+L_F) \times N+L_K+L_{SIG}$=5200 [byte]. The communication amount of authentication data transmitted from the authentication target apparatus to the authentication system is $L_F \times N+L_{SIG}+L_I$=4224 [byte].

TABLE 1

Examples of a required memory size and a communication amount for a case where an intermediate image value is not used (First comparative example – The number N of indices = 256)

| Item | Size [byte] | Number | Total Size [byte] |
|---|---|---|---|
| Preimage Length $L_P$ | 16 | 256 | 4096 |
| Mapping Length $L_F$ | 16 | 256 | 4096 |
| Signature Length $L_{SIG}$ | 64 | 1 | 64 |
| Required Memory Size $(L_P + L_F)*N + L_{SIG}$ | | | 8256 |
| Communication Amount $L_F*N + L_{SIG} + L_P$ | | | 4176 |

TABLE 2

Examples of a required memory size and a communication amount for a case where an intermediate image value is used (First working example – The number N of indices = 256)

| Item | Size [byte] | Number | Total Size [byte] |
|---|---|---|---|
| Preimage Length $L_P$ | 4 | 256 | 1024 |
| Mapping Length $L_F$ | 16 | 256 | 4096 |
| Chip-Specific Value Length $L_K$ | 16 | 1 | 16 |
| Signature Length $L_{SIG}$ | 64 | 1 | 64 |
| Required Memory Size $(L_P + L_F)*N + L_K + L_{SIG}$ | | | 5200 |
| Intermediate Image Length $L_I$ | 64 | — | — |
| Communication Amount $L_F*N + L_{SIG} + L_I$ | | | 4224 |

From comparison between Table 1 and Table 2, it is apparent that the first working example has allowed the required memory size of the authentication target apparatus to be reduced from 8256 bytes to 5200 bytes compared to the first comparative example, regardless of the addition of the chip-specific value k. Especially, as opposed to the first comparative example in which the preimage length is required to be large to some extent as a preimage value per se is transmitted to the authentication host, the first working example transmits an intermediate image value to the authentication host while keeping secrecy of a preimage value, thereby allowing the preimage length to be reduced. This intermediate image value may be deleted upon completion of the authentication processing, and does not consume the capacity of the non-volatile memory. Therefore, according to the first working example, a required amount of the memory can be suppressed while maintaining the same robustness of authentication as the first comparative example, or while improving robustness of authentication by increasing the number N of indices.

Note that although the present section has described an example that uses SHA-512, which is a cryptographic hash function, to derive an intermediate image value and a mapped value, it goes without saying that other hash functions may be used. For example, SHAKE-256, which has been defined by the NIST as FIPS PUB 202, can also be used. As the output length of SHAKE-256 is variable, using SHAKE-256 as the first function h1 and the third function h3 allows the intermediate image length to be much longer than 64 bytes. Although the extension of the intermediate image length increases the time period required for hash computation and data transmission, it makes copying of intermediate image values more difficult.

In the field of computer security, a so-called side-channel attack has been known as one of techniques for attacks against an authentication system. The side-channel attack is intended to obtain unknown information, such as an encryption key or a password, based on differences in information (e.g., a processing period, electromagnetic waves, or sounds) that leaks physically or electromagnetically from a computation apparatus that performs encryption computation via a channel different from a normal signal channel. An attacker normally prepares a variety of types of input data by changing a part of known input data, and inputs them repeatedly to the authentication system; in this way, the attacker obtains a large amount of information that has leaked, and guesses unknown information by statistically analyzing differences in the information that has leaked. In contrast, in the first working example, a value that is input to a hash function for derivation of an intermediate image value (the concatenation of a preimage value and a chip-specific value) is not exposed to the outside at all. In this case, it is difficult for an attacker to prepare input data suitable for a side-channel attack; therefore, the first working example has great resistance to a side-channel attack as well.

3. Second Working Example 3-1. Exemplary Configuration of Authentication Chip

Figure 9:
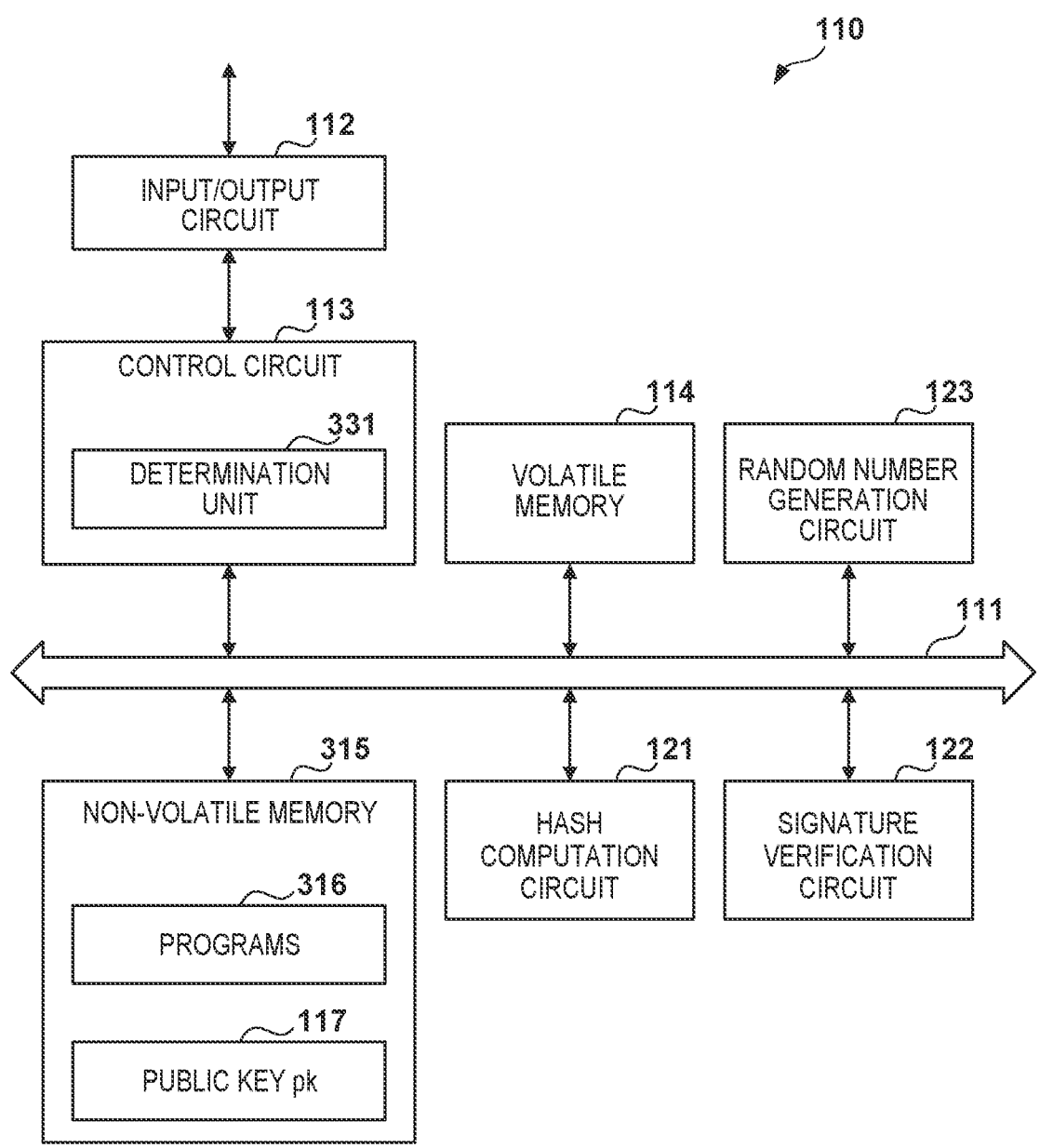
FIG. 9 is a block diagram showing an example of a configuration of an authentication chip according to a second working example.

FIG. 9 is a block diagram showing an example of a configuration of the authentication chip 110 according to a second working example. Referring to FIG. 9, the authentication chip 110 includes an internal bus 111, an input/output circuit 112, a control circuit 313, a volatile memory 114, a non-volatile memory 315, a hash computation circuit 121, a signature verification circuit 122, and a random number generation circuit 123.

The control circuit 313 is a control unit that controls communication with the authentication target apparatus. The control circuit 313 may be, for example, a CPU, a microcontroller, or a microprocessor, and executes various types of processing in accordance with commands input from the control apparatus 107. The non-volatile memory 315 is a storage unit that stores one or more computer programs 316 executed by the control circuit 313, control parameters (not shown), and a public key (pk) 117.

In the present working example, the control circuit 313 functions as a determination unit 331. In the present working example, authentication processing is not divided into a first determination stage and a second determination stage, unlike the first working example. The determination unit 331 performs authentication based on a response returned from the authentication target chip 210 responsively to a challenge by verifying an electronic signature value corresponding to an intermediate image value indicated by the response. A flow of this authentication processing will be described below in detail.

3-2. Exemplary Configuration of Authentication Target Chip

FIG. 10 is a block diagram showing an example of a configuration of the authentication target chip 210 according to the second working example. Referring to FIG. 10, the authentication target chip 210 includes an internal bus 211, a connection I/F 212, a control circuit 413, a volatile memory 214, a non-volatile memory 415, a hash computation circuit 221, and a read count circuit 222.

The control circuit 413 is a control unit that controls communication with the authentication system via the connection I/F 212. The control circuit 413 may be, for example, a CPU, a microcontroller, or a microprocessor. The non-volatile memory 415 is a storage unit that stores one or more computer programs 416 executed by the control circuit 413, control parameters (not shown), and various types of data required for authentication on the process cartridge 200. For example, in the present working example, the non-volatile memory 415 stores in advance a verification table 417 and a chip-specific value (k) 218 as authentication data. Furthermore, the non-volatile memory 415 stores a counter ($C_{read}$) 220.

In the present working example, the control circuit 413 functions as a read unit 431. The read unit 431 reads a preimage value identified by a challenge index from the verification table 417, converts the read preimage value into an intermediate image value, and transmits this intermediate image value to the authentication system. Furthermore, the read unit 431 reads a verification value identified by the same challenge index from the verification table 417, and transmits the read verification value to the authentication system. A flow of this read processing will be described below in detail.

Note that each of the circuits that are illustrated separately from the control circuit in FIG. 9 and FIG. 10 (e.g., the hash computation circuit, the signature verification circuit, and the read count circuit) may alternatively be implemented as a software module executed by the control circuit, rather than being implemented as an independent circuit. Furthermore, each of the modules that have been described as functions of the control circuit (e.g., the read unit and the determination unit) may alternatively be implemented as an independent circuit separate from the control circuit.

3-3. Generation of Authentication Data and Storing of the Same into Memory

In a cartridge manufacturing phase, a manufacturer of the process cartridge 200 generates a chip-specific value k of the cartridge, as well as N pairs of a preimage value and a verification value to be included in the above-described verification table. In the present working example, each of the N verification values is an electronic signature value used for verification on authenticity of a mapped value that has been derived by deriving an intermediate image value through application of a corresponding preimage value to a first function, and further by applying the derived intermediate image value to a second function. Then, the authentication target chip 210 including the non-volatile memory 415 that have stored these pieces of data is embedded in the process cartridge 200. In the present section, processing of the above-described cartridge manufacturing phase will be described.

Figure 11:
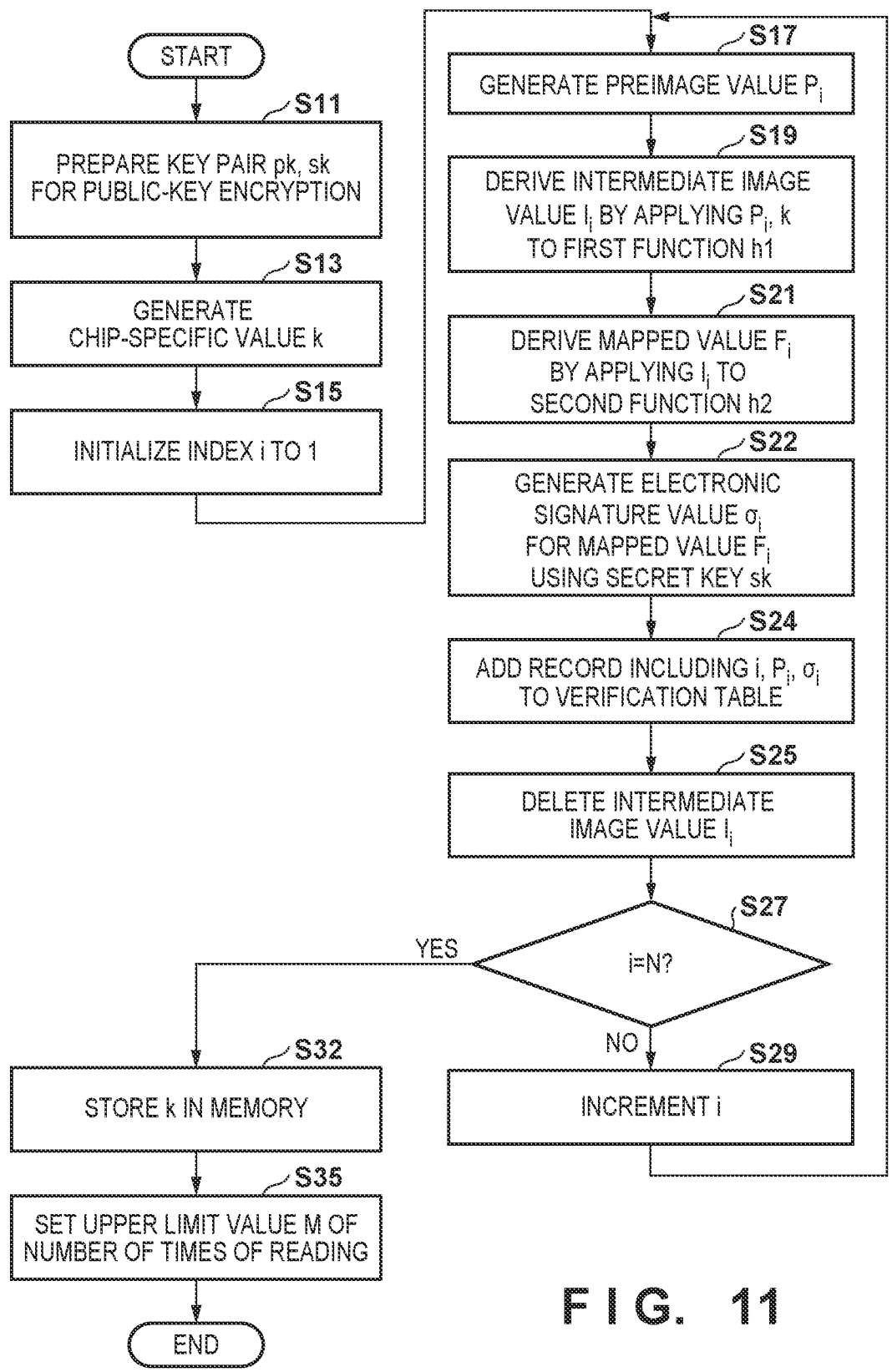
FIG. 11 is a flowchart showing an example of a flow of data generation processing for generating data to be stored in a memory of the authentication target chip according to the second working example.

FIG. 11 is a flowchart showing an example of a flow of data generation processing for generating data to be stored in the non-volatile memory 415. The data generation processing of FIG. 11 may be executed on an apparatus different from the image forming apparatus 100 and the process cartridge 200.

As steps S11 to S21 of FIG. 11 are processing steps that are the same as steps S11 to S21 of FIG. 4, a description thereof is omitted here. After a mapped value $F_i$ has been derived in step S21 from an intermediate image value $I_i$ that has been derived based on a preimage value $P_i$ and the chip-specific value k in step S19, an electronic signature value $\sigma_i$ for the mapped value $F_i$ is generated using a secret key sk in accordance with the following expression (7) in step S22.

$$\sigma_i = \text{Sign}(sk, F_i) \quad (7)$$

The function Sign in expression (7) denotes a digital signature algorithm. The digital signature algorithm used here may be the digital signature algorithm that has been described in relation to expression (3) of the first working example. The first argument of the function Sign is the secret key sk, and the second argument thereof is the mapped value $F_i$. The length $L_{SIG}$ of the signature value $\sigma_i$ output from the function Sign is $L_{SIG}=64$ [byte].

Next, in step S24, one record including the index i, the preimage value $P_i$, and the signature value $\sigma_i$ is added to the verification table 417. Next, in step S25, the intermediate image value $I_i$ used for derivation of the mapped value $F_i$ is deleted.

Next, in step S27, whether the variable i has reached the number N of value pairs to be generated is determined. In a case where the variable i has not reached N, the variable i is incremented (i←i+1) in step S29, and the above-described steps S17 to S25 are repeated with respect to the value of the next index. In a case where the variable i has reached N, processing proceeds to step S32.

In step S32, the chip-specific value k is stored into the non-volatile memory 415. Although not shown in FIG. 11, the public key pk, which is paired with the secret key sk used in repetitive generation of the electronic signature value in step S22, is stored into the non-volatile memory 315 in the manufacturing phase of the authentication chip 110.

Next, in step S35, a parameter M indicating an upper limit of the number of times a preimage value is read from the verification table 217 is set at a predetermined value. Here, the predetermined value is an integer that is equal to or larger than one, and is smaller than N. For example, M may be eight. Then, the data generation processing of FIG. 11 is ended.

FIG. 12 is an explanatory diagram for describing a configuration of the verification table 417 according to the present working example. Referring to FIG. 12, the verification table 417 includes three data items: Index 241, Preimage Value 242, and Signature Value 443. Signature Value 443 is a numerical value that is used as a verification value in the present working example, and is used for verification on an intermediate image value derived based on a corresponding value under Preimage Value 242. The non-volatile memory 415 in the authentication target apparatus stores in advance N records in such a verification table 417 generated by repeating step S24 of the data generation processing shown in FIG. 11 N times.

3-4. Authentication on Cartridge

Figure 13:
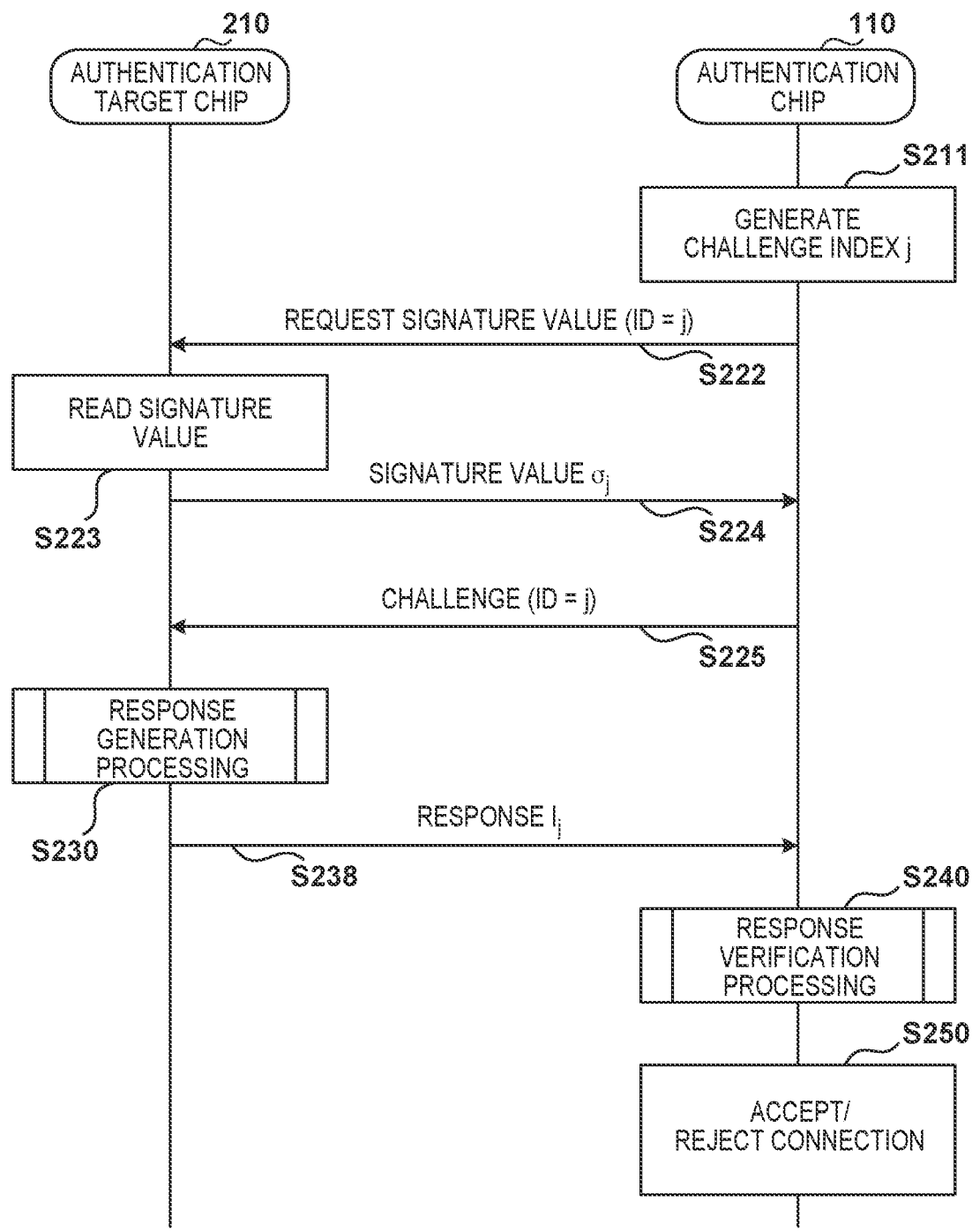
FIG. 13 is a sequence diagram showing an example of an overall flow of authentication processing according to the second working example.

FIG. 13 is a sequence diagram showing an example of an overall flow of the authentication processing according to the present working example. The authentication processing shown in FIG. 13 is started on the occurrence of a trigger, which is the sensor 105's detection of attachment of the process cartridge 200 to the image forming apparatus 100. The authentication chip 110 of the image forming apparatus 100 and the authentication target chip 210 of the process cartridge 200 are mainly involved in the authentication processing.

Referring to FIG. 13, first, the determination unit 331 of the authentication chip 110 causes the random number generation circuit 123 to generate a challenge index j in step S211. The challenge index j is an integer value that is randomly determined within the range of the indices in the verification table 417 of the authentication target chip 210. Next, the determination unit 331 transmits a signature value request indicating the value of the challenge index j to the authentication target chip 210. In response to reception of the signature value request, the read unit 431 of the authentication target chip 210 reads the $j^{th}$ signature value $\sigma_j$ from the verification table 417 in step S223. Then, in step S224, the read unit 431 transmits the read signature value $\sigma_j$ to the authentication chip 110.

Next, in step S225, the determination unit 331 transmits a challenge indicating the value of the challenge index j to the authentication target chip 210. In response to reception of the challenge, the read unit 431 of the authentication target chip 210 executes response generation processing in step S230. A flow of the response generation processing executed here may be similar to the flow of the response generation processing S130 that has been described in relation to the first working example; therefore, a description thereof is omitted here.

In step S238, the read unit 431 returns a response that has been generated through the above-described response generation processing to the authentication chip 110. In a case where the counter $C_{read}$ has not reached the upper limit value M yet in the response generation processing, this response indicates the value of the first intermediate image value $I_j$ corresponding to the challenge index j. Upon receiving the response from the authentication target chip 210, the determination unit 331 of the authentication chip 110 executes response verification processing in step S240.

Figure 14:
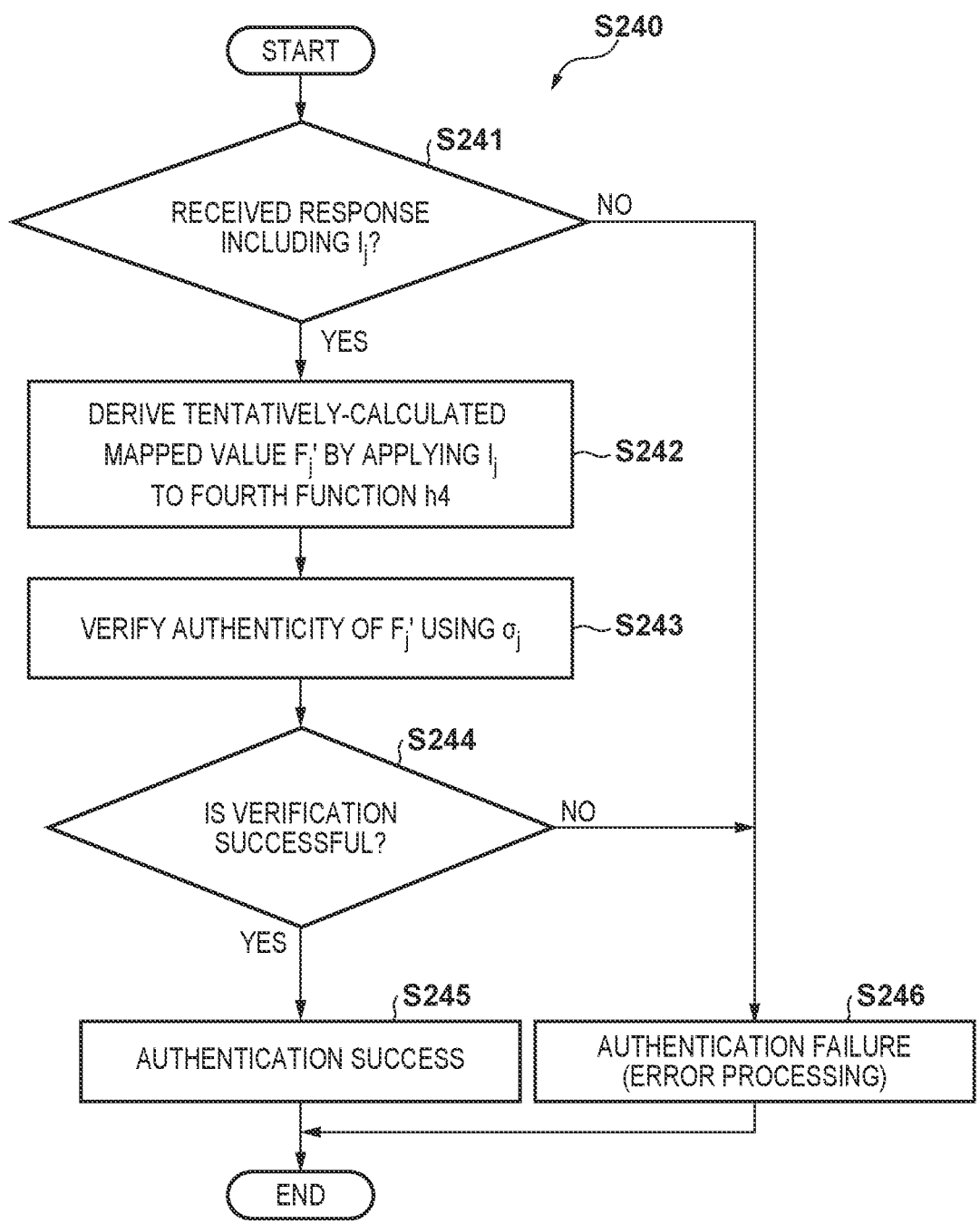
FIG. 14 is a flowchart showing an example of a detailed flow of response verification processing shown in FIG. 13.

FIG. 14 is a flowchart showing an example of a detailed flow of the response verification processing that is executed by the determination unit 331 of the authentication chip 110 in step S240 of FIG. 13.

As steps S241 and S242 of FIG. 14 are processing steps that are the same as steps S141 and S142 of FIG. 8, a description thereof is omitted here. After the first tentatively-calculated mapped value $F_j'$ has been derived based on the first intermediate image value $I_j$ in step S242, the determination unit 331 causes the signature verification circuit 122 to verify authenticity of the first tentatively-calculated mapped value $F_j'$ using the signature value $\sigma_j$ in step S243. Here, the signature verification can be denoted by the following expression (8).

$$\text{res}=\text{Verify } (pk, F_j', \sigma_j) \tag{8}$$

The function Verify of expression (8) represents a digital signature verification algorithm corresponding to the digital signature algorithm used in expression (7). The first argument of the function Verify is the public key pk stored in the non-volatile memory 315, the second argument thereof is the first tentatively-calculated mapped value $F_j'$, and the third argument thereof is the signature value $\sigma_j$. The output res of the function Verify indicates the signature verification result, that is to say, whether the verification has been successful or failed, using a logical value ("true" or "false").

Thereafter, processing bifurcates in step S244 depending on the signature verification result. In a case where the signature verification result res indicates "true", the determination unit 331 determines that the authentication on the authentication target chip 210 is successful in step S245. On the other hand, in a case where the signature verification result res indicates "false", the determination unit 331 determines that the authentication on the authentication target chip 210 has failed in step S246. The reason for the authentication failure can be, for example, the failure in signature verification or the error on the number of times of reading.

Returning to FIG. 13, in step S250, the determination unit 331 notifies the control apparatus 107 of the engine controller 101 of the result of the above-described response verification processing. In a case where the authentication has been successful, the control apparatus 107 accepts connection of the process cartridge 200, and enables image formation using the process cartridge 200. For example, the control apparatus 107 may read other control parameters that can be held in the memory of the process cartridge 200, and use the same for later image forming operations.

On the other hand, in a case where the authentication has failed, the control apparatus 107 rejects (or suspends) connection of the process cartridge 200, and warns a user that the process cartridge 200 is not a genuine product. As stated earlier, the warning may be provided using any technique, for example, by displaying a warning message on a display of the image forming apparatus 100, lighting a warning lamp, outputting a warning sound, or the like.

In the present working example, too, the above-described authentication processing may typically be executed upon detecting that a new cartridge has been attached to the image forming apparatus 100, and not be executed in a case where a cartridge that has been removed once has been attached to the same image forming apparatus 100 again.

Note that in the present working example, as the mapped values $F_1, \ldots, F_N$ are not exposed, the second function h2 and the fourth function h4 may be identity functions (the function computation per se may be omitted). In other words, each mapped value $F_i$ (i=1, ..., N) may be equal to a corresponding intermediate mapped value $I_i$, and the first tentatively-calculated mapped value $F_j$ may be equal to a first intermediate mapped value $I_j$. Therefore, each signature value $\sigma_i$ (i=1, ..., N) may be regarded as an electronic signature value used for verification on authenticity of a corresponding intermediate mapped value $I_i$.

3-5. Summary of Second Working Example

In the above-described second working example, the authentication target apparatus transmits only a verification value corresponding to a challenge index to the authentication system, instead of all of the N verification values. Therefore, the communication amount of authentication data transmitted from the authentication target apparatus to the authentication system in the second working example is smaller compared to the first working example.

In the second working example, too, the number of times the authentication target apparatus reads a preimage value from a memory in response to a challenge from the same authentication system is suppressed so as not to exceed the upper limit value M. In addition, at most M intermediate image values that are derived based on corresponding preimage values are exposed to the outside as responses to challenges, instead of preimage values per se. By setting this upper limit value M in such a manner that it is sufficiently smaller than the total number N of preimage values, the exposure ratio M/N can be kept low so that an apparatus manufactured by a fraudulent third party is prevented from passing the authentication. Especially, in the second working example also, the length $L_P$ of each preimage value is small, such as 4 bytes, and therefore the number N of preimage values that can be stored using the same amount of memory resource can be increased; this effectively contributes to suppression of the exposure ratio M/N.

The following Table 3 and Table 4 show an example of comparison between a second comparative example and the second working example in terms of a required memory size and a communication amount; the second comparative example uses a preimage value to respond to a challenge without using an intermediate image value, whereas the second working example uses an intermediate image value generated based on a preimage value to respond to a challenge. In both of the second comparative example and the second working example, the number N of indices=256, and the signature length $L_{SIG}$=64 [byte].

In the second comparative example, the preimage length $L_P$ is set at 16 bytes so as to make the exhaustive search difficult. In the second comparative example, a chip-specific value k is not used. In this case, as shown in Table 3, the required memory size of the authentication target apparatus is $(L_P+L_{SIG}) \times N=20480$ [byte]. The communication amount of authentication data transmitted from the authentication target apparatus to the authentication system is $L_{SIG}+L_P=80$ [byte].

On the other hand, in the second working example, the preimage length $L_P$ is set at 4 bytes. In addition, a chip-specific value k of the length $L_K=16$ bytes is used. Note that the same chip-specific value k is used for N preimage values. The intermediate image length $L_I$ is set at 64 bytes. In this case, as shown in Table 4, the required memory size of the authentication target apparatus is $(L_P+L_{SIG})\times N+L_K=17424$ [byte]. The communication amount of authentication data transmitted from the authentication target apparatus to the authentication system is $L_{SIG}+L_I=128$ [byte].

TABLE 3

Examples of a required memory size and a communication amount for a case where an intermediate image is not used (Second comparative example − The number N of indices = 256)

| Item | Size [byte] | Number | Total Size [byte] |
|---|---|---|---|
| Preimage Length $L_P$ | 16 | 256 | 4096 |
| Signature Length $L_{SIG}$ | 64 | 256 | 16384 |
| Required Memory Size $(L_P + L_{SIG})$*N | | | 20480 |
| Communication Amount $L_{SIG} + L_P$ | | | 80 |

TABLE 4

Examples of a required memory size and a communication amount for a case where an intermediate image is used (Second working example − The number N of indices = 256)

| Item | Size [byte] | Number | Total Size [byte] |
|---|---|---|---|
| Preimage Length $L_P$ | 4 | 256 | 1024 |
| Signature Length $L_{SIG}$ | 64 | 256 | 16384 |
| Chip-Specific Value Length $L_K$ | 16 | 1 | 16 |
| Required Memory Size $(L_P + L_{SIG})$*N + $L_K$ | | | 17424 |
| Intermediate Image Length $L_I$ | 64 | — | — |
| Communication Amount $L_{SIG} + L_I$ | | | 128 |

From comparison between Table 3 and Table 4, it is apparent that the second working example has allowed the required memory size of the authentication target apparatus to be reduced from 20480 bytes to 17474 bytes compared to the second comparative example, regardless of the addition of the chip-specific value k. Especially, as opposed to the second comparative example in which the preimage length is required to be large to some extent as a preimage value per se is transmitted to the authentication host, the second working example transmits an intermediate image value to the authentication host while keeping secrecy of a preimage value, thereby allowing the preimage length to be reduced. This intermediate image value may be deleted upon completion of the authentication processing, and does not consume the capacity of the non-volatile memory. Therefore, according to the second working example, a required amount of the memory can be suppressed while maintaining the same robustness of authentication as the second comparative example, or while improving robustness of authentication by increasing the number N of indices.

Furthermore, in the present working example, too, a value that is input to a hash function for derivation of an intermediate image value is not exposed to the outside at all, and therefore it is possible to realize great resistance to a side-channel attack.

4. Third Working Example

A third working example is a derivative of the first working example. In the first working example, authentication on the authentication target apparatus is performed based on an intermediate image value $I_j$ indicated by a response corresponding to one challenge index j in the second determination stage S120; in the third working example, authentication on the authentication target apparatus is performed based on a larger number of intermediate image values.

The configuration of the authentication chip 110 according to the third working example may be similar to the configuration that has been described using FIG. 2. Furthermore, the configuration of the authentication target chip 210 according to the third working example may be similar to the configuration that has been described using FIG. 3. In the third working example, the non-volatile memory 215 of the authentication target chip 210 stores data generated through the data generation processing that has been described using FIG. 4 in the cartridge manufacturing phase. The contents that have been described above in relation to the first working example apply equally to the present working example, unless specifically stated otherwise in the present section.

Figure 15:
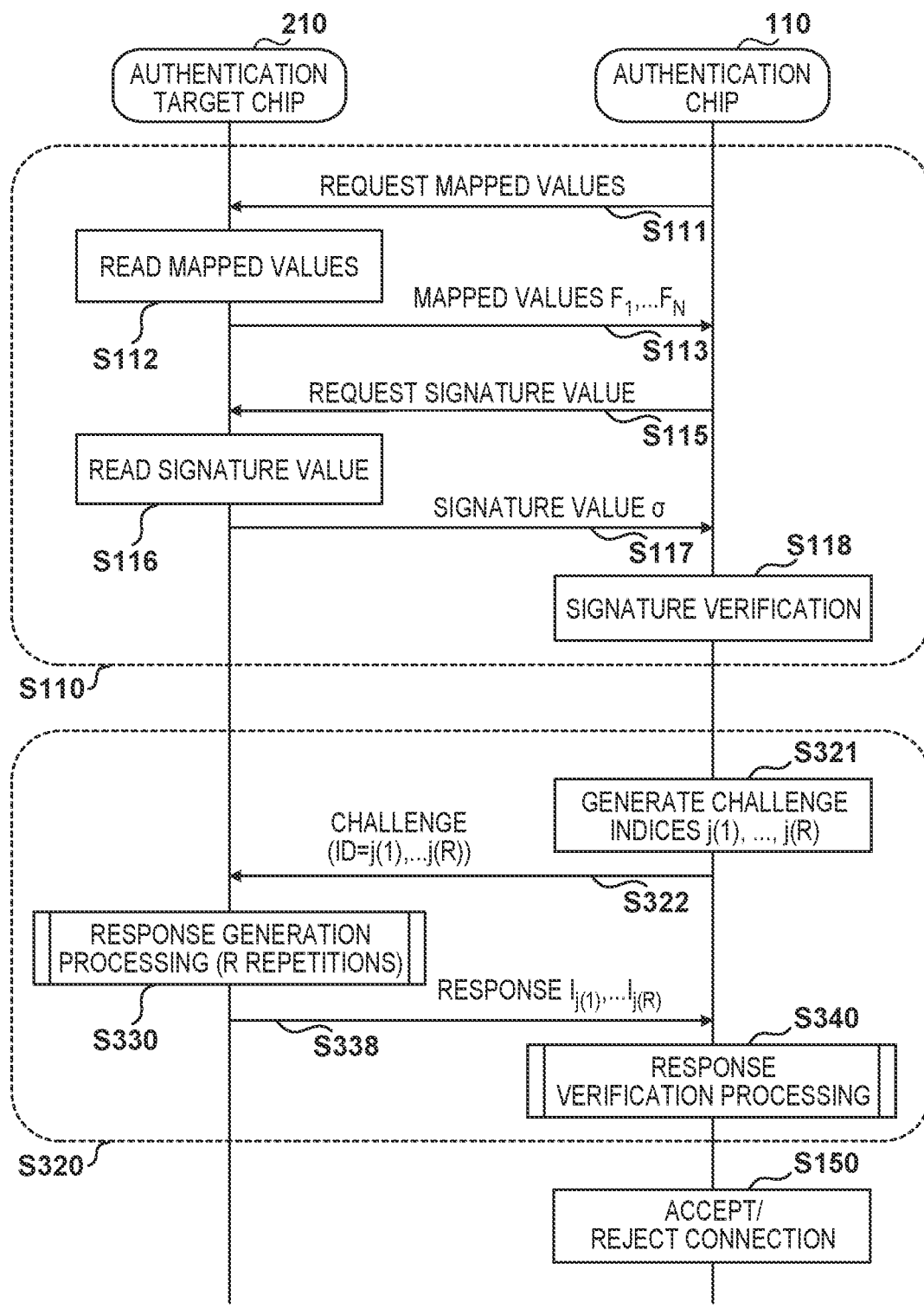
FIG. 15 is a sequence diagram showing an example of an overall flow of authentication processing according to a third working example.

FIG. 15 is a sequence diagram showing an example of an overall flow of authentication processing according to the present working example. The authentication processing shown in FIG. 15 is started on the occurrence of a trigger, which is the sensor 105's detection of attachment of the process cartridge 200 to the image forming apparatus 100. The authentication chip 110 of the image forming apparatus 100 and the authentication target chip 210 of the process cartridge 200 are mainly involved in the authentication processing.

In the example of FIG. 15, the authentication processing is made up of a primary determination stage S110 and a secondary determination stage S320. A flow of processing of the primary determination stage S110 may be similar to the flow that has been described using FIG. 6; therefore, a description thereof is omitted here.

In the secondary determination stage S320, first, the secondary determination unit 132 of the authentication chip 110 causes the random number generation circuit 123 to generate R challenge indices $j_{(1)}, \ldots, j_{(R)}$ in step S321. R denotes an integer that is equal to or larger than two, and is smaller than N. These challenge indices are integer values which are different from one another and which are randomly determined within the range of the indices. As one example, N may be 384, and R may be 2. Next, in step S322, the secondary determination unit 132 transmits a challenge indicating the values of the R challenge indices to the authentication target chip 210.

In response to reception of the challenge, the secondary read unit 232 of the authentication target chip 210 repeatedly executes response generation processing R times in step S330. A flow of the response generation processing executed here may be similar to the flow that has been described using FIG. 7. However, in step S133, the secondary read unit 232 reads R preimage values $P_{(1)}, \ldots, P_{(R)}$ that respectively correspond to the R challenge indices $j_{(1)}, \ldots, j_{(R)}$ from the verification table 217. Also, in step S134, the secondary read unit 232 derives R intermediate image values $I_{(1)}, \ldots, I_{(R)}$ by applying each of the read R preimage values $P_{(1)}, \ldots, P_{(R)}$ to the third function h3. A response generated in step S135 indicates the R intermediate image values $I_{(1)}, \ldots, I_{(R)}$ that have been derived. In a case where the number of times of reading $C_{read}$, which is counted by the read count circuit 222, has already reached the upper limit value M, the secondary read unit 232 can generate a response indicating an error on the number of times of reading.

In step S338, the secondary read unit 232 returns a response indicating the values of the R intermediate image values $I_{j(1)}, \ldots, I_{j(R)}$, which have been generated through the above-described response generation processing, to the authentication chip 110. Upon receiving the response from the authentication target chip 210, the secondary determination unit 132 of the authentication chip 110 executes response verification processing in step S340.

Figure 16:
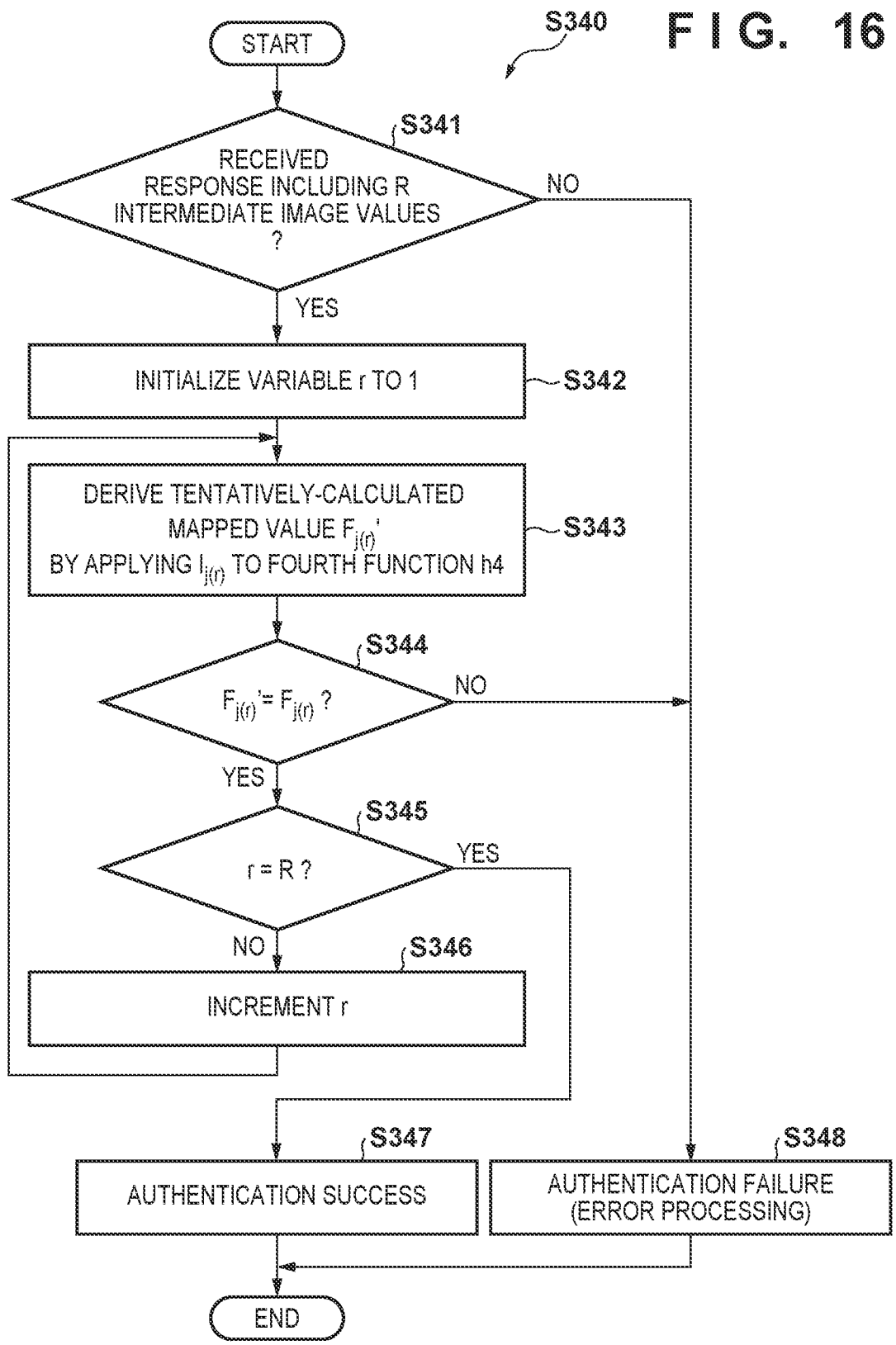
FIG. 16 is a flowchart showing an example of a detailed flow of response verification processing shown in FIG. 15.

FIG. 16 is a flowchart showing an example of a detailed flow of the response verification processing that is executed by the secondary determination unit 132 of the authentication chip 110 in step S340 of FIG. 15.

Referring to FIG. 16, first, the secondary determination unit 132 determines whether the received response indicates values of R intermediate image values $I_{j(1)}, \ldots, I_{j(R)}$ that respectively correspond to the R challenge indices in step S341. In a case where the response indicates values of R intermediate image values $I_{j(1)}, \ldots, I_{j(R)}$, processing proceeds to step S342. On the other hand, in a case where the response indicates some sort of error (e.g., the error on the number of times of reading), processing proceeds to step S348.

In step S342, the secondary determination unit 132 initializes a variable r to one. Next, in step S343, the secondary determination unit 132 causes the hash computation circuit 121 to derive a first tentatively-calculated mapped value $F_{j(r)}'$ by applying a first intermediate image value $I_{j(r)}$ to the fourth function h4 as indicated by the above-described expression (6). Next, in step S344, the secondary determination unit 132 compares the first tentatively-calculated mapped value $F_{j(r)}'$ derived in step S343 with a corresponding mapped value $F_{j(r)}$ identified by an index j(r) out of the N mapped values received from the authentication target chip 210 in step S113. Here, in a case where the first tentatively-calculated mapped value $F_{j(r)}'$ matches the corresponding mapped value $F_{j(r)}$, processing proceeds to step S345. On the other hand, in a case where the first tentatively-calculated mapped value $F_{j(r)}'$ does not match the corresponding mapped value $F_{j(r)}$, processing proceeds to step S348.

In step S345, the secondary determination unit 132 determines whether the variable r has reached the number R of the challenge indices. In a case where the variable r has not reached the number R yet, the variable r is incremented in step S346, and the above-described steps S343 to S345 are repeated with respect to the next index j(r). On the other hand, in a case where the variable r has reached the number R, processing proceeds to step S347.

In step S347, the secondary determination unit 132 determines that the authentication on the authentication target chip 210 is successful as the first tentatively-calculated mapped value $F_{j(r)}'$ matches the corresponding mapped value $F_{j(r)}$ with respect to all of the R challenge indices j(r). On the other hand, in step S348, the secondary determination unit 132 determines that the authentication on the authentication target chip 210 has failed because of the error on the number of times of reading, or mismatch of at least one mapped value.

Returning to FIG. 15, in step S150, the secondary determination unit 132 notifies the control apparatus 107 of the engine controller 101 of the result of the above-described response verification processing.

Note that the mapping length $L_F$ in the present working example may be 1/R of the mapping length $L_F$ in the first working example. That is to say, in a case where the mapping length $L_F$ is 16 bytes (=128 bits) and R=2 in the first working example, the mapping length $L_F$ may be 8 bytes (=64 bits) in the present working example. In this case, the number of attempts for an exhaustive search that is needed to guess all of the R mapped values $F_{j(r)}$ is $2^{64 \times 2} (=2^{128})$, and the same computational security as the first working example is ensured.

The following Table 5 shows a required memory size and a communication amount in the third working example in which authentication is performed based on two intermediate image values that are returned in response to two challenge indices (i.e., R=2). In the third working example, the number N of indices=384, the preimage length $L_P$=4 [byte], the mapping length $L_F$=8 [byte], the chip-specific value length $L_K$=16 [byte], and the signature length $L_{SIG}$=64 [byte].

The required memory size of the authentication target apparatus is $(L_P + L_F) \times N + L_K + L_{SIG} = 4688$ [byte]. The communication amount of authentication data transmitted from the authentication target apparatus to the authentication system is $L_F \times N + L_{SIG} + L_I \times R = 3264$ [byte].

TABLE 5

Examples of a required memory size and a communication amount for a case where an intermediate image is used (Third working example – The number N of indices = 384, the number R of repetitions = 2)

| Item | Size [byte] | Number | Total Size [byte] |
|---|---|---|---|
| Preimage Length $L_P$ | 4 | 384 | 1536 |
| Mapping Length $L_F$ | 8 | 384 | 3072 |
| Chip-Specific Value Length $L_K$ | 16 | 1 | 16 |
| Signature Length $L_{SIG}$ | 64 | 1 | 64 |
| Required Memory Size $(L_P + L_F)*N + L_K + L_{SIG}$ | | | 4688 |
| Intermediate Image Length $L_I$ | 64 | 2 | 128 |
| Communication Amount $L_F*N + L_{SIG} + L_I*R$ | | | 3264 |

From comparison between Table 2 and Table 5, it is apparent that the third working example allows the required memory size to be reduced from 5200 bytes to 4688 bytes while maintaining the same resistance to an exhaustive search compared to the first working example.

Table 6 shows comparison between the first working example and the third working example in terms of the exposure ratio and the fraudulence acceptance ratio in a case where the upper limit value M of the number of times of reading is eight and the number R of repetitions in the third working example is equal to two. Here, the fraudulence acceptance ratio denotes the probability that authentication on an authentication target apparatus that has been manufactured by copying exposed intermediate image values becomes successful by mistake.

TABLE 6

Comparison of the exposure ratio and the fraudulence acceptance ratio (First working example vs. Third working example)

| Item | First working example | Third working example |
|---|---|---|
| Upper limit of the number of times of reading | 8 | 16 |
| Exposure ratio | 1/32 | 1/24 |
| Fraudulence acceptance ratio | 0.03125 | 0.00163 |

In the first working example, the exposure ratio is $1/32$ as at most 8 intermediate image values based on preimage values are exposed out of the total number of 256. The probability of one index that is newly determined randomly being included in the indices of the exposed intermediate image values is $1/32$, and the fraudulence acceptance ratio in the first working example is $1/32 = 0.03125$. On the other hand, in the third working example, the exposure ratio is $16/384 = 1/24$ as at most $8 \times 2 = 16$ intermediate image values based on preimage values are exposed out of the total number of 384. The probability of both of two indices that are newly determined randomly being included in the indices of the exposed intermediate image values is $(16/384) \times (23/383) \approx 0.00163$. That is to say, the fraudulence acceptance ratio in the third working example is smaller than one-tenth of the fraudulence acceptance ratio in the first working example. In this way, the third working example can significantly suppress the fraudulence acceptance ratio while reducing the required memory size compared to the first working example.

5. Review

The foregoing has described various embodiments and working examples of the technique according to the present disclosure using FIG. 1 to FIG. 16. In the above-described embodiments, the authentication target apparatus, which is a target of authentication performed by the authentication system, stores in advance N value pairs identified by indices in a memory, and each value pair includes a preimage value and a verification value used for verification on an intermediate image value derived based on the preimage value. When connected to the authentication system, the authentication target apparatus reads at least one verification value (or all of the N verification values) from the memory, and transmits the same to the authentication system. Furthermore, the authentication target apparatus reads a first preimage value corresponding to a challenge index received from the authentication system from the memory, derives a first intermediate image value based on the read first preimage value, and transmits the derived first intermediate image value to the authentication system. The aforementioned at least one verification value transmitted to the authentication system includes a value used for verification on the first intermediate image value in the authentication system. According to this mechanism, as intermediate image values transmitted to the authentication system need not be permanently stored in the memory of the authentication target apparatus, the length of the intermediate image values can be extended to the extent that copying becomes difficult without increasing the required amount of the non-volatile memory. Furthermore, the required amount of the non-volatile memory can be reduced by reducing the length of preimage values while making it difficult to guess the preimage values from the intermediate image values exposed to the outside. In the first working example that uses a mapped value derived based on an intermediate image value as a verification value, only a markedly small amount of memory is needed. Meanwhile, in the second working example that uses an electronic signature value for verification on authenticity of a mapped value or an intermediate image value as a verification value, the communication amount of authentication data transmitted from the authentication target apparatus to the authentication system can be reduced. In the third working example that performs authentication based on a plurality of intermediate image values that respectively correspond to a plurality of challenge indices, the probability that a non-genuine authentication target apparatus is determined to be a genuine product by mistake can be significantly suppressed.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-190572, filed on Nov. 29, 2022 which is hereby incorporated by reference herein in its entirety.

What is claimed is:

1. An authentication target apparatus comprising:
   one or more memory devices that store a set of instructions and that store in advance N value pairs (N is an integer equal to or larger than two) identified by indices and an electronic signature value used for verification on authenticity of the N verification values, each value pair including
      a preimage value; and
      a verification value used for verification on an intermediate image value derived based on the preimage value, wherein each verification value is a mapped value that is derived by applying a corresponding preimage value to a first function to derive an intermediate image value and then applying the intermediate image value to a second function;
   a connection interface that is communicatively connected to an authentication system that authenticates the authentication target apparatus; and
   one or more processors that execute the set of instructions to:

control communication with the authentication system via the connection interface;

read the N verification values from the one or more memory devices;

transmit the read N verification values to the authentication system;

receive a challenge index identifying one out of the N value pairs from the authentication system;

read a first preimage value corresponding to the challenge index out of the N preimage values from the one or more memory devices;

derive a first intermediate image value by applying the read first preimage value to a third function corresponding to the first function;

transmit the derived first intermediate image value to the authentication system;

read the electronic signature value from the one or more memory devices; and transmit the read electronic signature value to the authentication system.

2. The authentication target apparatus according to claim 1, wherein the authentication on the authentication target apparatus is determined to be successful in a case where a tentatively-calculated mapped value derived by applying the first intermediate image value received from the authentication target apparatus to a fourth function corresponding to the second function matches a first mapped value that is one of the N verification values received from the authentication target apparatus at the authentication system.

3. The authentication target apparatus according to claim 1, wherein the one or more processors are configured to execute the set of instructions to:

receive R challenge indices (R is an integer that is equal to or larger than two and is smaller than N) from the authentication system via the connection interface;

read R preimage values that respectively correspond to the R challenge indices from the one or more memory devices;

derive R intermediate image values by applying each of the read R preimage values to the third function; and transmit the derived R intermediate image values to the authentication system.

4. The authentication target apparatus according to claim 3, wherein the authentication on the authentication target apparatus is determined to be successful in a case where all of R tentatively-calculated mapped values derived by applying each of the R intermediate image values received from the authentication target apparatus to a fourth function corresponding to the second function match mapped values that respectively correspond thereto out of the N verification values at the authentication system.

5. The authentication target apparatus according to claim 1, wherein the one or more processors are configured to execute the set of instructions to:

count the number of times a preimage value has been read from the one or more memory devices in response to reception of a challenge index from the authentication system; and reject reading of a preimage value from the one or more memory devices in response to reception of a new challenge index from the authentication system in a case where the counted number of times of reading has reached M (M is an integer that is equal to or larger than one and is smaller than N).

6. An authentication target apparatus comprising:

one or more memory devices that store a set of instructions and that store in advance N value pairs (N is an integer equal to or larger than two) identified by indices, each value pair including:

a preimage value; and a verification value used for verification on an intermediate image value derived based on the preimage value, wherein each verification value is an electronic signature value used for verification on authenticity of a mapped value that is derived by applying a corresponding preimage value to a first function to derive an intermediate image value and then applying the intermediate image value to a second function, or on authenticity of the intermediate image value;

a connection interface that is communicatively connected to an authentication system that authenticates the authentication target apparatus; and one or more processors that execute the set of instructions to:

control communication with the authentication system via the connection interface;

receive a challenge index identifying one out of the N value pairs from the authentication system;

read a first verification value corresponding to the challenge index out of the N verification values from the one or more memory devices;

transmit the read first verification value to the authentication system;

read a first preimage value corresponding to the challenge index out of the N preimage values from the one or more memory devices;

derive a first intermediate image value by applying the read first preimage value to a third function corresponding to the first function; and transmit the derived first intermediate image value to the authentication system.

7. The authentication target apparatus according to claim 6, wherein the authentication on the authentication target apparatus is determined to be successful in a case where verification on authenticity of a tentatively-calculated mapped value based on the first intermediate image value received from the authentication target apparatus using the first verification value has been successful at the authentication system.

8. An authentication target apparatus comprising:

one or more memory devices that store a set of instructions and that store in advance N value pairs (N is an integer equal to or larger than two) identified by indices, each value pair including:

a preimage value; and a verification value used for verification on an intermediate image value derived based on the preimage value, wherein each verification value is a mapped value that is derived by applying a corresponding preimage value to a first function to derive an intermediate image value and then applying the intermediate image value to a second function;

a connection interface that is communicatively connected to an authentication system that authenticates the authentication target apparatus; and one or more processors that execute the set of instructions to:

control communication with the authentication system via the connection interface;

read the N verification values from the one or more memory devices;

transmit the read N verification values to the authentication system;

receive a challenge index identifying one out of the N value pairs from the authentication system;

read a first preimage value corresponding to the challenge index out of the N preimage values from the one or more memory devices;

derive a first intermediate image value by applying the read first preimage value to a third function corresponding to the first function; and transmit the derived first intermediate image value to the authentication system, wherein the first function and the third function are cryptographic hash functions.

9. The authentication target apparatus according to claim 8, wherein the one or more memory devices are configured to further store a secret value that is specific to the authentication target apparatus, and the first function and the third function accept the secret value, together with a preimage value, as inputs, and output a corresponding intermediate image value.

10. The authentication target apparatus according to claim 9, wherein a length of the intermediate image value derived based on the preimage value is longer than a length of the preimage value.

11. The authentication target apparatus according to claim 10, wherein a length of the mapped value derived based on the intermediate image value is shorter than the length of the intermediate image value.

12. An authentication system for authenticating an authentication target apparatus, the authentication target apparatus having stored in advance N value pairs (N is an integer equal to or larger than two) identified by indices and an electronic signature value used for verification on authenticity of the N verification values, each value pair including:

a preimage value; and a verification value used for verification on an intermediate image value derived based on the preimage value, each verification value being a mapped value that is derived by applying a corresponding preimage value to a first function to derive an intermediate image value and then applying the intermediate image value to a second function:

the authentication system comprising:

a connection interface that is communicatively connected to the authentication target apparatus;

one or more memory devices that store a set of instructions; and one or more processors that execute the set of instructions to:

control communication with the authentication target apparatus via the connection interface;

receive the N verification values from the authentication target apparatus;

transmit a challenge index identifying one out of the N value pairs to the authentication target apparatus;

receive, from the authentication target apparatus, a first intermediate image value derived by applying a first preimage value corresponding to the challenge index to a third function corresponding to the first function;

derive a first tentatively-calculated mapped value by applying the received first intermediate image value to a fourth function corresponding to the second function;

authenticate the authentication target apparatus through comparison between the derived first tentatively-calculated mapped value and a corresponding first mapped value included in the N verification values;

read the electronic signature value from the one or more memory devices; and transmit the read electronic signature value to the authentication system.

13. The authentication system according to claim 12, wherein the authentication target apparatus has further stored in advance an electronic signature value used for verification on authenticity of the N verification values, and the one or more processors are configured to execute the set of instructions to:

receive the electronic signature value from the authentication target apparatus; and verify the authenticity of the N verification values using the received electronic signature value.

14. The authentication system according to claim 12, wherein the one or more processors are configured to execute the set of instructions to:

transmit R challenge indices (R is an integer that is equal to or larger than two and is smaller than N) to the authentication target apparatus;

receive, from the authentication target apparatus, R intermediate image values derived by applying each of R preimage values that respectively correspond to the R challenge indices to the third function; and authenticate the authentication target apparatus through comparison between R tentatively-calculated mapped values derived by applying each of the received R intermediate image values to the fourth function and mapped values that respectively correspond thereto out of the N verification values.

15. The authentication system according to claim 12, wherein reading of a preimage value in response to reception of a new challenge index from the authentication system is rejected in a case where the number of times a preimage value has been read in the authentication target apparatus in response to reception of a challenge index from the authentication system has reached M (M is an integer that is equal to or larger than one and is smaller than N).

16. The authentication system according to claim 12, wherein the first function and the third function are cryptographic hash functions.

17. The authentication system according to claim 16, wherein the authentication target apparatus has further stored a secret value that is specific to the authentication target apparatus, and the first function and the third function accept the secret value, together with a preimage value, as inputs, and output a corresponding intermediate image value.

18. The authentication system according to claim 17, wherein a length of the intermediate image value derived based on the preimage value is longer than a length of the preimage value.

19. The authentication system according to claim 18, wherein a length of the mapped value derived based on the intermediate image value is shorter than the length of the intermediate image value.

20. An authentication system for authenticating an authentication target apparatus, the authentication target apparatus having stored in advance N value pairs (N is an integer equal to or larger than two) identified by indices, each value pair including a preimage value, and a verification value used for verification on an intermediate image value derived based on the preimage value, each verification value being an electronic signature value used for verification on authenticity of a mapped value that is derived by applying a corresponding preimage value to a first function to derive an intermediate image value and then applying the intermediate image value to a second function, or on authenticity of the intermediate image value;

the authentication system comprising:

a connection interface that is communicatively connected to the authentication target apparatus;

one or more memory devices that store a set of instructions; and one or more processors that execute the set of instructions to:

control communication with the authentication target apparatus via the connection interface;

transmit a challenge index identifying one out of the N value pairs to the authentication target apparatus;

receive a first verification value corresponding to the challenge index out of the N verification values from the authentication target apparatus;

receive, from the authentication target apparatus, a first intermediate image value derived by applying a first preimage value corresponding to the challenge index out of the N preimage values to a third function corresponding to the first function; and authenticate the authentication target apparatus through verification on authenticity of a first tentatively-calculated mapped value based on the received first intermediate image value, or on authenticity of the first intermediate image value, using the received first verification value.

* * * * *